US009239935B2

(12) United States Patent
Cai et al.

(10) Patent No.: US 9,239,935 B2
(45) Date of Patent: Jan. 19, 2016

(54) CLOAKING WITH FOOTPRINTS TO PROVIDE LOCATION PRIVACY PROTECTION IN LOCATION-BASED SERVICES

(71) Applicant: IOWA STATE UNIVERSITY RESEARCH FOUNDATION, INC., Ames, IA (US)

(72) Inventors: Ying Cai, Ames, IA (US); Ge Xu, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 14/472,462

(22) Filed: Aug. 29, 2014

(65) Prior Publication Data

US 2015/0007341 A1 Jan. 1, 2015

Related U.S. Application Data

(62) Division of application No. 12/555,456, filed on Sep. 8, 2009, now Pat. No. 8,856,939.

(60) Provisional application No. 61/094,635, filed on Sep. 5, 2008.

(51) Int. Cl.
*H04L 29/06* (2006.01)
*G06F 21/62* (2013.01)
*H04W 4/02* (2009.01)
*H04W 12/02* (2009.01)

(52) U.S. Cl.
CPC ........ *G06F 21/6254* (2013.01); *H04L 63/0421* (2013.01); *H04L 63/18* (2013.01); *H04W 4/02* (2013.01); *G06F 2221/2111* (2013.01); *H04W 12/02* (2013.01)

(58) Field of Classification Search
CPC ... H04W 4/02; G06F 17/30241; H04L 67/08; H04L 67/18
USPC ........................................ 726/4, 26
See application file for complete search history.

(56) References Cited

U.S. PATENT DOCUMENTS

| 5,050,212 A * | 9/1991 | Dyson ................ G06F 11/1497 340/5.8 |
| 2004/0215516 A1* | 10/2004 | Denoon ................ G06F 3/014 705/14.1 |

(Continued)

OTHER PUBLICATIONS

Barkhuus, Louise et al., "Location-Based Services for Mobile Telephony: a study of users' privacy concerns", Proceedings of the Interact 2003, 9th IFIP TC13 International Conference.

(Continued)

*Primary Examiner* — Dao Ho
(74) *Attorney, Agent, or Firm* — Mckee, Voorhees & Sease, PLC

(57) ABSTRACT

A method for using a location-based service while preserving anonymity includes receiving a location associated with a mobile node, receiving an anonymity level associated with the mobile node, computing a region containing the location of the mobile node and a number of footprints based on the anonymity level, wherein each of the footprints from a different user, and providing the region to a location-based service to thereby preserve anonymity of the mobile node. A method also allow a mobile device or its user to specify the anonymity level by selecting a public region consistent with a user's feelings towards desired privacy.

6 Claims, 23 Drawing Sheets

(56) References Cited

U.S. PATENT DOCUMENTS

| | | | |
|---|---|---|---|
| 2004/0248570 A1* | 12/2004 | Denenberg | H04M 3/42153 455/432.3 |
| 2006/0165100 A1* | 7/2006 | Huang | H04W 64/00 370/400 |
| 2007/0055859 A1* | 3/2007 | Yang | G06F 9/4401 713/2 |

OTHER PUBLICATIONS

Cai, Ying et al., "Design, Analysis, and Implementation of a Large-scale Real-time Location-based Information Sharing System", MobiSys '08, Jun. 17-20, 2008, pp. 106-117.

Gedik, Bugra et al., "A Customizable k-Anonymity model for Protecting Location Privacy", Apr. 2004, pp. 1-12.

Gedik, Bugra et al., "Location Privacy in Mobile Systems A Personalized Anonymization Model", 2005 IEEE, 20 pages.

Gedik et al., "Protecting Location Privacy with Personalized k-Anonymity", Jan. 2008, IEEE, vol. 7, pp. 1-18.

Gruteser, Marco et al., "Anonymous Usage of Location-based Services through Spatial and Temporal Cloaking", In ACM MobiSys 2003, pp. 31-42, 2003.

Gruteser, Marco et al. "Protecting Privacy in Continuous Location—Tracking Applications", 2004 IEEE, pp. 28-34.

Kalnis et al., "Preventing Location-Base Identity Interference in Anonymous Spatial Queries", Aug. 2007, IEE, vol. 19.

Xu, Toby et al., "Location Anonymity in Continuous Location-based Services", Proceedings of the 15th International Symposium on Advances in Geographic Information Systems, ACM GIS 2007, pp. 1-8.

Xu, Toby et al., "Exploring Historical Location Data for Anonymity Preservation in Location-based Services", IEEE INFOCOM 2008, pp. 1220-1228.

Xu, Toby et al., "Exploring Historical Location Data for Anonymity Preservation in Location-based Services", Iowa State University, downloaded on Sep. 9, 2009 from IEEE xplore. pp. 1220-1228.

Xu, Toby et al., "Feeling-based Location Privacy Protection for Location-based Services", CCS '09, Nov. 9-13, 2009, pp. 348-357.

Gkoulalas-Divanis, Aris et al. "Providing K-Anonymity in Location Based Services", SIGKDD Explorations, vol. 12, Issue 1, 8 pages, Jun. 2010.

Terrovitis, Manolis et al., "Privacy Preservation in the Publication of Trajectories", The 9th Int'l Conference on Mobile Data Management, IEEE Computer Society, pp. 65-72.

\* cited by examiner

CLOAKING WITH FOOTPRINTS TO PROVIDE LOCATION PRIVACY PROTECTION IN LOCATION-BASED SERVICES

CROSS-REFERENCE TO RELATED APPLICATIONS

This is a Divisional application of U.S. Ser. No. 12/555,456 filed Sep. 8, 2009, which claims priority under 35 U.S.C. §119 to provisional application Ser. No. 61/094,635 filed Sep. 5, 2008, all of which are herein incorporated by reference in their entirety.

FIELD OF THE INVENTION

The present invention relates to location-based services. More particularly, but not exclusively, the present invention relates to providing privacy protection in location-based services.

BACKGROUND OF THE INVENTION

Many applications today rely on location information of users or devices, yet disclosing such information without appropriate measures presents heightened privacy and safety threats. Currently there is no technique which can effectively prevent one from being identified and located should one's detailed movement be tracked. This lack of protection has greatly hindered the development and deployment of a wide range of important applications like location-based services. There is an urgent need, therefore, to develop techniques that allow users or devices to disclose their location information as accurately as possible for useful applications while providing them location privacy protection, i.e., ensuring such information cannot be used by adversaries to derive who is where at what time.

In addition, there are problems relating to a user's ability to specify a desired level of privacy protection in a meaningful way. What is needed is a convenient and effective way for users to specify their desired level of privacy protection.

SUMMARY

Therefore, it is a primary object, feature, or advantage of the present invention to improve over the state of the art.

It is a further object, feature, or advantage of the present invention to enable location privacy protection in location-based services via historical location information.

Another object, feature, or advantage of the present invention is to provide location privacy protection in location-based services which is robust.

Yet another object, feature, or advantage of the present invention is to provide location privacy protection in location-based services which allows for users to specify the level of privacy they wish to have in a meaningful way.

One or more of these and/or other objects, features, or advantages of the present invention will become apparent from the specification and claims that follow. No single embodiment of the present invention need exhibit all objects, feature, or advantages of the present invention.

A spatial region with K different footprints indicates that it has been visited by K different people. An adversary may be able to identify all these users, but will not know who was there at what time. This observation gives us a new direction to investigate location depersonalization in location-based services (LBSs). We propose to leverage users' historical location samples, each being a footprint, to cloak their current location. For each location/trajectory reported for LBSs, we ensure that it has been visited earlier by at least K−1 other users. In contrast to existing techniques which depersonalize a user's location based on her current neighbors, our approach is able to provide a certain level of guarantee that a user's location information, either a single location sample or a time-series sequence of them, cannot be correlated with restricted spaces such as home and office to derive who's where at what time. In addition to location privacy protection, using footprints for cloaking can significantly improve cloaking resolution and allow mobile nodes to report their location only when they are engaged in LBSs. We present novel algorithms for single location sample cloaking and trajectory cloaking, and evaluate their performance under various conditions using location data generated based on real road maps. Our results show that the proposed techniques have a minimal impact on the quality of LBSs.

In addition, a feeling based privacy model for location privacy protection is provided. Here, a user expresses her privacy requirement by specifying a public region, instead of a value of K. A spatial region is considered a user's public region if the user feels comfortable that the region is reported as her current location when the user is inside the region. For example, a shopping mall can be a user's public region, if the user does not mind that the mall is disclosed as her location when she requests an LBS in it. Given a public region specified by a user, we apply the concept of entropy to measure its popularity based on the footprints collected from the visitors of the region. This popularity is then used as the user's privacy requirement. For each location disclosed on behalf of the user, we ensure that the popularity of this location is no less than that of the specified public region. Methods allow for a user's time-series location information to be reported as accurately as possible while ensuring that her location privacy requirement is always met. The method used cloaks a user's movement on the fly without having to know the moving trajectory in advance. As such, the method can be used in application scenarios where a user needs to make frequent location updates along a trajectory that is not predetermined. In addition, the method guarantees that a desired level of location privacy cannot be compromised even if the distribution of users' footprints is not uniform along the trajectory.

According to one aspect of the present invention, a method for using a location-based service while preserving anonymity is provided. The method includes receiving a location associated with a mobile node, receiving an anonymity level associated with the mobile node, computing a region containing the location of the mobile node and a number of footprints based on the anonymity level, wherein each of the footprints from a different user, and providing the region to a location-based service to thereby preserve anonymity of the mobile node.

According to another aspect of the present invention, a method for using a location-based service while preserving anonymity is provided. The method includes determining a base trajectory associated with a mobile node, the base trajectory comprising at least two points, and determining an anonymity level, K, associated with the mobile node. The method further includes computing a K-anonymity trajectory using the base trajectory, the anonymity level, and a set of other trajectories. The method further includes providing the K-anonymity trajectory to a location-based service to thereby preserve anonymity of the mobile node.

According to one aspect of the present invention, a method for using a location-based service while preserving anonymity is provided. The method includes receiving a location associated with a mobile node and receiving an anonymity level associated with the mobile node. The method further includes computing a region containing the location of the mobile node and a number of footprints based on the anonymity level, wherein each of the footprints from a different user. Then the method provides the region to a location-based service to thereby preserve anonymity of the mobile node.

According to another aspect of the present invention, a method for using a location-based service while preserving anonymity. The method includes determining a base trajectory associated with a mobile node, the base trajectory comprising at least two points. The method further includes determining an anonymity level, K, associated with the mobile node and computing a K-anonymity trajectory using the base trajectory, the anonymity level, and a set of other trajectories. The method provides the K-anonymity trajectory to a location-based service to thereby preserve anonymity of the mobile node.

According to another aspect of the present invention, an apparatus for providing location-based services while preserving anonymity is provided. The apparatus includes an anonymity server configured for receiving a location associated with a mobile node, determining the anonymity level associated with the mobile node, computing a region containing the location of the mobile node and a number of footprints based on the anonymity level, and communicating the region to a location-based service to thereby preserve anonymity of the mobile node. The anonymity server may be so configured by placing instructions for performing such steps on a computer readable media and executing those instructions.

According to another aspect of the present invention, a method for providing location-based services while preserving anonymity is provided. The method includes determining a base trajectory associated with a mobile device, the base trajectory comprising at least two points, determining anonymity level, K, associated with the mobile device and computing a K-anonymity trajectory using the base trajectory, the anonymity level, and a set of other trajectories. The method further includes providing the K-anonymity trajectory to a location-based service to thereby preserve anonymity of the mobile device. The anonymity level may be determined by a spatial region specified by the mobile device or its user.

According to another aspect of the present invention, a method for providing location based services to a user is provided. The method includes providing the user with a mobile device, the mobile device having a cellular transceiver and a global positioning system (gps) receiver and wherein the mobile device is configured to receive a selection of a spatial region from the user. The method further includes receiving a selection of the spatial region from the user, computing an anonymity level associated with the user using a computer, and receiving a location associated with the mobile device. The method provides for computing a region containing the location of the mobile device and a number of footprints based on the anonymity level, wherein each of the footprints being from a different user and then providing the region to a location-based service to thereby preserve anonymity of the mobile device.

DETAILED DESCRIPTION OF THE PREFERRED EMBODIMENT

1. Introduction

Figure 1:
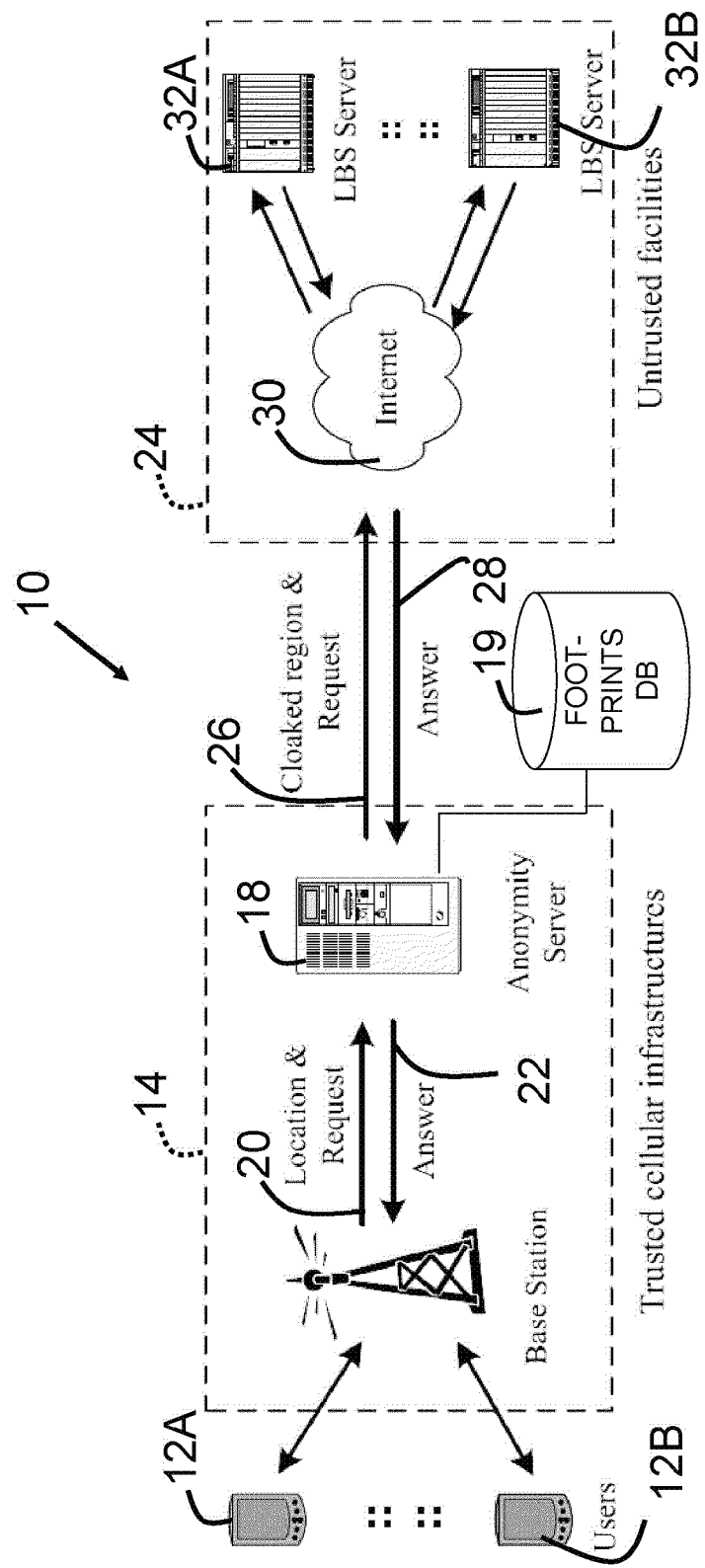
FIG. 1 illustrates one embodiment of a system architecture where a user requests an LBS through a central anonymity server which is trusted.

Location-based services (LBSs) allow users to query useful information such as nearest hotels, restaurants, and so on. While such applications offer significant opportunities for a broad range of markets, a major concern is the potential abuse of location data collected by service providers. Physical destinations such as medical clinics may indicate a person's health problems. Likewise, regular stops at certain types of places may be linked directly to one's lifestyle or political association. When location data is subject to risks such as potential misuse by insiders, unintentional or mistaken disclosure, encryption and policy-based approaches generally do not work. In the case of LBSs, users need to supply their location in order to use the services, yet the service provider may not be trustworthy in keeping this information safe. The users may be informed of the policies regarding the collection and distribution of their location data. In reality, however, the execution of these policies is typically beyond their control and relies solely on the service providers.

Knowing that location information may fall into a wrong hand, it is natural and necessary for a user to withhold her true identity when requesting an LBS. Unfortunately, simply using a pseudonym, or not using an identifier at all, is not sufficient because a user's location itself may be correlated with restricted spaces such as home and office to reveal her real-world identity. Even if an individual location sample may not be linked to a subject, the accumulation of location data will eventually reveal the user. This problem has motivated a series of research efforts on location depersonalization (e.g., [10], [8], [19], [16], [5], [3], [15], [6], [9]). Instead of disclosing a user's accurate location, the basic idea of the proposed techniques is to compute a cloaking box which contains the user and at least K−1 others, and report this box as the user's location in requesting a LBS. Since each cloaking box contains a certain number of current users, this strategy provides a desired level of guarantee that a cloaking box cannot be linked to some specific user.

The above techniques can support anonymous uses of LBSs, but not location privacy protection. Given a cloaking box submitted at time t, an adversary may not know which node requests the service, but knows for sure that the service requestor is inside the area at that time. In particular, by correlating with restricted spaces, the adversary has the potential to identify all nodes that were inside the cloaking box at time t. This presents serious privacy threats, because "where you are and who you are with are closely correlated with what you are doing" [18]. In addition to location privacy leak, these existing techniques have the following limitations:

They require latest location information from all mobile nodes in order to compute cloaking boxes. In reality, nodes not needing LBSs may not be willing to disclose their location. Excessive location updates from a large number of mobile nodes also present overwhelming communication and processing bottlenecks on the server side.

Besides the practicality and scalability issues, another problem is, when the node is in an unpopulated area, its cloaking box can be very large. A fine cloaking resolution is critical for the quality of a LBS. One can compute a smaller cloaking box after more nodes come nearby. This approach, however, requires to delay a service request and the delay is indefinite.

Finally, existing techniques cannot be used in continuous LBSs, wherein users report their location frequently. Simply ensuring each reported location is a cloaking box containing at least K nodes does not give a user K-anonymity protection. A time-series sequence of cloaking boxes form a trajectory that may reveal a user if, for instance, it links to the user's home and office.

Our research aims at addressing the above problems, with an emphasis on location privacy protection. Specifically, we want to prevent a user's location information, either a single location sample or a time-series sequence of them, from being correlated with restricted spaces to derive who's where at what time. Our key idea is to cloak users' current location with their historical location samples, each called a footprint. For each location or trajectory reported in service requests, we ensure that it has been visited earlier by at least K−1 other users. Given a spatial region with K different footprints, an adversary may be able to identify all corresponding users, but will not know who was there at what time. With this basic idea in place, we present efficient algorithms for single location cloaking and trajectory cloaking. For the former, which depersonalizes a user's current position, we propose an efficient algorithm that can find the minimum bounding circle that bounds the user and at least K−1 others. The latter is to depersonalize a user's time-series location samples. To our knowledge, no practical solution can be found for this purpose in literature. We give a formal definition of K-anonymity trajectory (KAT) and address the challenges of computing such trajectories with cloaking resolution that is as fine as possible. The performance of our techniques is studied under various conditions using location data synthetically generated based on real road maps.

The rest of this description is organized as follows. In Section II, we review related works in more detail. In Section III, we give an overview of our system model. The proposed techniques for single location cloaking and trajectory cloaking are presented in Section IV and V, respectively. The proposed techniques are evaluated in Section VI. We conclude in Section VII.

2. Related Work

Anonymous uses of LBSs: Gruteser and Grunwald first investigated this problem [10] and proposed reducing location accuracy along spatial and/or temporal dimensions for anonymity protection. When a client requests a service, the proposed scheme computes a cloaking box that contains the client and at least K−1 others, and then uses this cloaking box as the client's location to request the service. If the resolution of a location is too coarse for quality services, temporal cloaking is applied, i.e., delaying a user's service request. When more mobile nodes come near to the user, a smaller cloaking area can then be computed. This basic concept has been improved by a series of works. Gedik and Liu [8] considered minimizing the size of the cloaking boxes, a factor critical for the quality of location-based services, and allowing users to specify their own value of K. The techniques proposed in [19], [16], and [5] address the challenges of processing location-dependent queries with location of reduced resolution. Preventing an adversary from identifying a subject based on her moving pattern was considered in [3] and [15]. The proposed techniques cloak a client's position using the neighbors that have been close to the client for some time period. All these techniques rely on a central anonymity server, which tracks the movement of mobile nodes and computes cloaking boxes upon requests. Location cloaking in fully distributed mobile peer-to-peer environments was investigated by Chow at el [6]. Assuming mobile nodes trust each other, the proposed technique lets mobile nodes exchange location information and collaborate in computing cloaking boxes. More recently, Ghinita et al proposed a distributed cloaking algorithm [9] which guarantees service anonymity even if the adversary knows the exact locations of all users. These existing works, as mentioned in the introduction, aim at supporting anonymous uses of LBSs, but not location privacy protection.

Trajectory perturbation: Beresford and Stajano first investigated the problem of trajectory perturbation and proposed the concept of mix zone [2]. A mix zone is defined to be a spatial region in which a mobile node does not report its location. When there are multiple nodes inside the same mix zone, they exchange their pseudonyms. After exiting the mix zone, these nodes start to use new pseudonyms in location updates, making it hard for an adversary to link incoming and outgoing paths of these nodes. While this approach relies on a set of pre-defined spatial regions for pseudonym exchange, the path confusion algorithm proposed by Hoh and Gruteser [12] allows mobile nodes to switch their pseudonyms when their paths are close to each other, say, within some threshold. Another strategy they proposed is to ensure that the time interval between two consecutive location reports is long enough so that each can be considered as an independent event [14]. These approaches reduce, but cannot prevent, location privacy risks. A partial trace, or just a single location sample, can be sufficient for an adversary to identify a user, thus knowing her whereabouts.

Privacy protection in opportunistic sensing and monitoring: Kapadia et al proposed a framework [17][7] that allows sensor-equipped mobile devices to report context information (e.g., traffic conditions, pollution reading) from their vicinity without risking their owners' location privacy. The system partitions the network domain into many tiles, each being a region that K users typically visit within a short time interval, and lets each node report its location at a granularity of tiles. It is unclear, though, how mobile nodes are updated with the latest tessellation information. Moreover, the proposed system assumes that each report is an independent event. In parallel to this work, Hoh et al proposed a system for privacy-preserving traffic monitoring based on the concept of virtual trip lines (VTLs) [13]. A VTL is a geographic marker that indicates where a vehicle needs to make a traffic report. For privacy protection, these markers are placed to avoid particularly sensitive areas. Their distances are also made large enough to prevent a user's consecutive location updates from being re-linked as a trajectory. This approach cannot be used for location privacy protection in location-based services because the placement of VTLs is pre-determined.

3. System Overview

Public areas like parks and highways are naturally depersonalized spatial regions—they are not private property like home and office which can reveal a subject's identity; and such areas are characterized by a large number of visits by different people at different times. In light of this observation, we propose to leverage users' historical location samples to cloak their current location. Specifically, for each location/trajectory reported for LBSs, we ensure that it has been visited earlier by at least K−1 different users. From an adversary's perspective, any of them could be the one that presents in the area at the service time. As such, this strategy provides a certain level of location privacy protection for the service users. In this section, we present an overview of the proposed system.

Similar to existing work (e.g., [10], [8], [19]), our system lets mobile nodes receive LBSs through an anonymity server, which is considered part of trusted infrastructures, as depicted in FIG. 1. For LBSs that require user authentication (e.g., for service charges), we assume anonymous authentication (e.g., [11], [23], [20]) is used. These schemes apply the concept of blind signature and allow a service provider to verify a user's legitimacy without having to request her true identity.

As shown in FIG. 1, a system 10 is provided. The system 10 includes a trusted cellular infrastructure subsystem 14 and an untrusted facilities subsystem 24. Mobile devices such as device 12A and 12B, each of which includes a GPS receiver and a cellular transceiver communicate with a base station 16. The base station 16 is in operative communication with an anonymity server 18 such that the base station can send location and request data 20 to the anonymity server 18 and the anonymity server 18 can respond with an answer 22. The anonymity server 18 may be operatively connected to a footprint database 19. The anonymity server 18 is also in operative communication with untrusted facilities 24. For example, the anonymity server 18 may send a cloaked region and request 26 through the internet 30 or other network to a location based service server 32 or 32B.

We assume the adversaries have access to anonymous location data collected by LBSs and are interested in finding who is where at what time by correlating such information with restricted spaces such office and home addresses. For LBSs, which may involve a large number of users and have a global coverage, such restricted space identification is probably the most realistic and economic way for location privacy intrusion. Unlike existing cloaking techniques, we do not consider observation attack [10]. If an adversary has direct observation over the region where a user locates, the user does not have location privacy anyway.

We also assume that the anonymity server is managed by some cellular service provider, through which mobile users have access to wireless communications. The cellular service provider offers anonymization services as a value-added feature to their clients, and supplies the anonymity server with the initial footprint database for cloaking. The location samples in the database may be collected from clients' regular phone calls. If such an initial database does not exist, we assume a location sampling phase, during which mobile nodes report their location periodically to the anonymity server. Unlike existing techniques, such periodic location update is no longer needed after the sampling phase, which may last only a short time period (e.g., a few days). More location data can be obtained from mobile nodes in their requests of LBSs and will be subsequently added to the database to improve cloaking resolution. Hereafter, we will use terms location sample and footprint interchangeably. Recall that a trajectory is a time-series sequence of footprints collected from a same user. Thus, the database can be considered as a trajectory repository.

Today's localization technologies allow cellular service providers to determine the position of a caller within a radius of 50 to 300 meters. In contrast, a GPS-enabled mobile device can detect its own position more precisely, up to 10 meter accurate. Due to this imperfect positioning, we use a spatial region, a circular region in particular, to represent each location sample. A rectangle can also be used to represent a location sample. However, rectangles of different shapes can have the same area, making it less desirable for cloaking.

Figure 2:
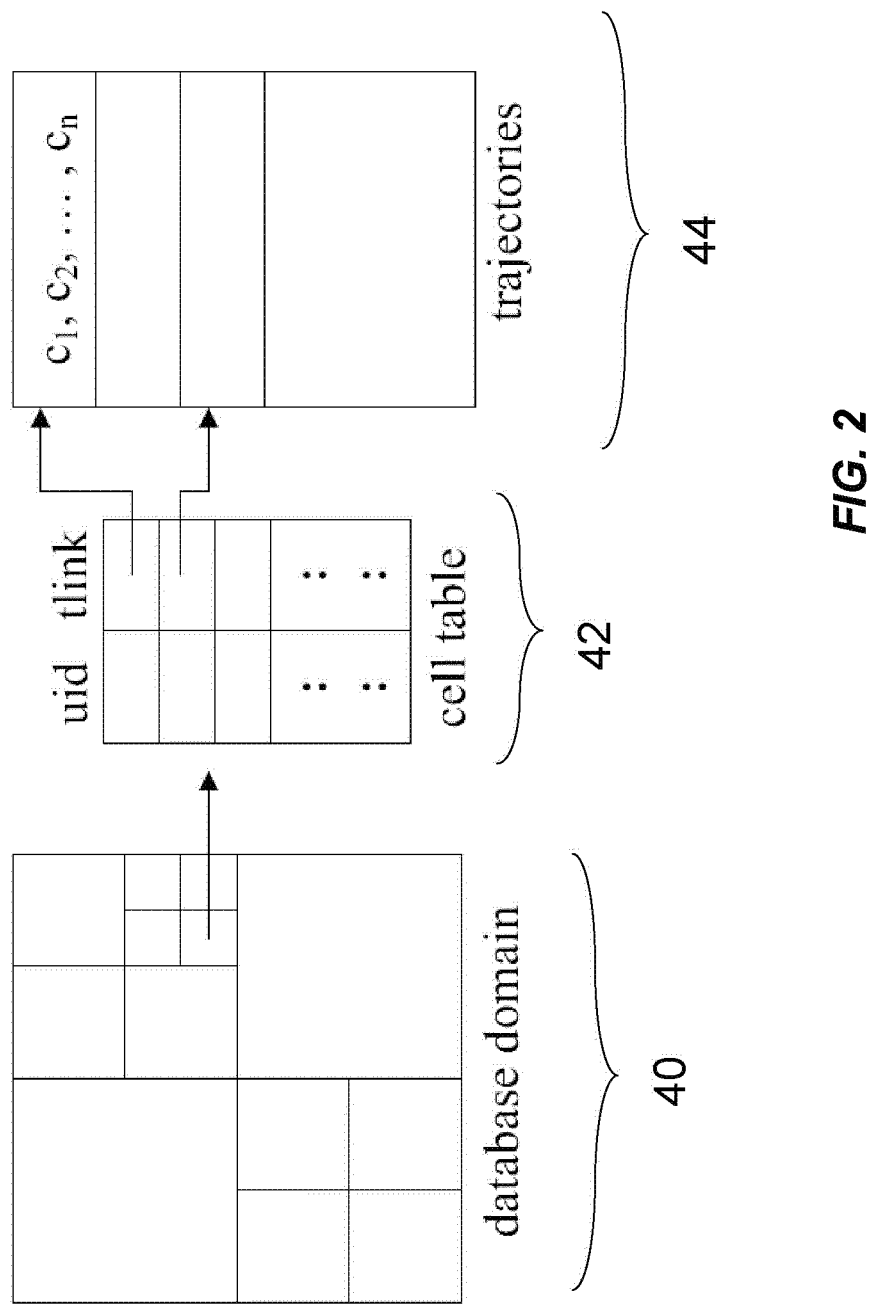
FIG. 2 illustrates a footprint database.

For efficient retrieval of location data, we index the footprint database using a simple grid-based approach, as illustrated in FIG. 2. We partition the network domain recursively into cells in a quad-tree style. Unless a cell is already at its minimal size (our implementation sets each cell to be at least $200 \times 200$ meter$^2$), it is split if the number of users who have footprints inside it exceeds some threshold. For each cell, we maintain a cell table, which stores a list of pointers that link to the trajectories which have at least one footprint that overlaps with the cell. Specifically, each tuple of a cell table is a record of (uid, tlink), where uid is the ID of a mobile node which traverses this cell, and tlink is a pointer that links to the node's trajectory information. Thus, given a cell, we can efficiently retrieve the trajectories that pass through the cell. As shown in FIG. 2, a database domain 40 is provided. A cell table 42 with pointers and links is provided, the links pointed to a table 44 of trajectories.

Supporting an instant LBS: To request an instant LBS, a mobile node reports its current location c and a desired anonymity level K to the anonymity server. In response, the server computes a circular region that contains c and K−1 footprints, each from a different user, and exports this region to the provider of the LBS. Based on this location information, the provider delivers the requested services (e.g., query results) to the anonymity server, which then forwards to the service user.

Supporting a continuous LBS: To receive a continuous LBS, a user reports the anonymity server a base trajectory $T_0=\{c_1, c_2, \ldots, c_n\}$, where $c_i$ is a location sample on the trajectory along which the user will move. For better quality of services, the user may choose to have more location samples on the base trajectory. The user may also let the anonymity server generate the trajectory by giving a starting position and a final destination. Given an anonymity level K and a base trajectory $T_0$, the server selects from the footprint database K−1 other users' trajectories, each having at least n footprints, and uses them to cloak $T_0$. The cloaking procedure will generate a K-anonymity trajectory (KAT) $T=\{C_1, C_2, \ldots, C_n\}$. By covering $T_0$ and footprints from at least other K−1 nodes, T can provide the user K-anonymity protection. A formal definition of KAT will be given later. After computing T, the server contacts the provider of the requested LBS to start a service session. As the node moves along the base trajectory $T_0$, it reports to the server whenever it arrives at $c_i$. In response, the server exports the corresponding $C_i$ to request the service on behalf of the user. When the service session terminates, the location data reported by the service user is added to the footprint database for future cloaking.

4. Single Location Sample Cloaking

Figure 3:
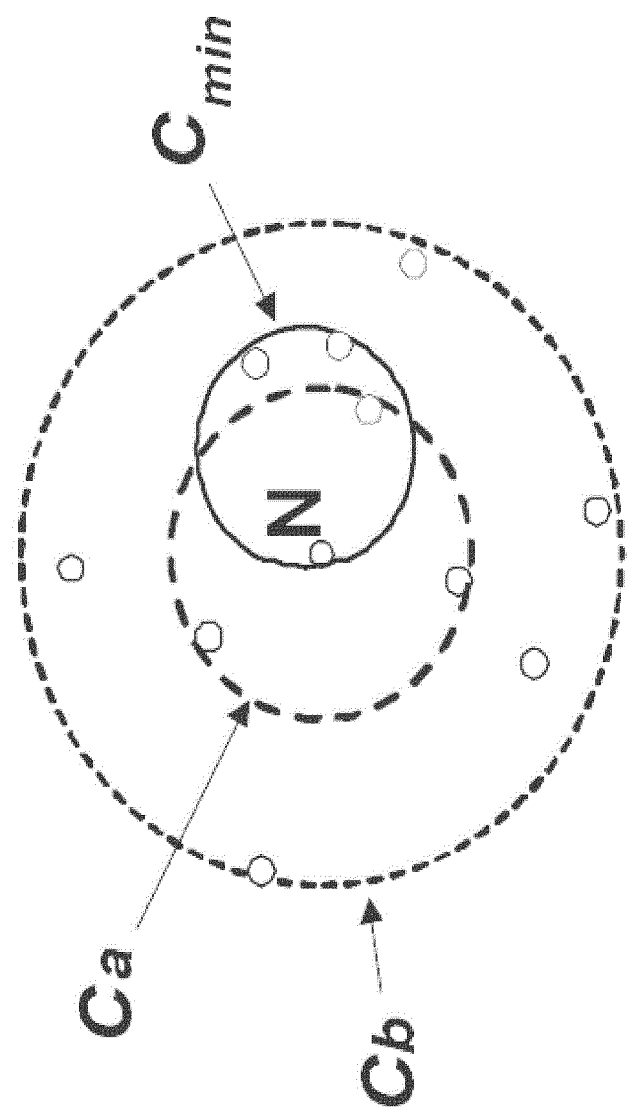
FIG. 3 illustrates that $C_{min}$ must be inside $C_b$ (K=4).

For instant LBSs, a mobile user N needs to report its location c and a desired anonymity level K. In response, the anonymity server computes a K-anonymity area (KAA) and uses this region to request the service on behalf of the client. For the sake of service quality, the size of the KAA should be as small as possible. In this section, we present an efficient algorithm for finding the minimum bounding circle (MBC) that bounds N and at least K−1 other nodes. Hereafter, we will use terms footprint and node interchangeably. To facilitate our discussion, we use $C_{min}$ to denote this MBC, $C_a$ a bounding circle that contains N and at least K−1 other nodes, and $C_b$ the circle centered at N with a radius that is two times that of $C_a$. Also, given a circle C, we denote its radius as C.R. These notations are illustrated in FIG. 3. Our algorithm of searching $C_{min}$ is based on the observation that $C_{min}$ must be bounded by $C_b$. By its definition, $C_a$ contains K footprints including N. Since $C_a$ is a candidate of $C_{min}$, $C_{min}$ must be no larger than $C_a$, i.e., $C_{min} \cdot R \leq C_a \cdot R$. Since both $C_{min}$ and $C_a$ contain N, the distance between any point in $C_{min}$ and N's position must not be larger than $2 \cdot C_a \cdot R$. As a result, $C_{min}$ must be inside $C_b$.

The problem now is to find a $C_a$ with a small radius. This can be done in different ways, depending on how the footprints are indexed. For instance, if R-tree is used, we can find N's K−1 nearest neighbors and use the MBC that bounds N and these K−1 nodes as $C_a$. Existing techniques (e.g., [21]) can find KNN at a cost of O(K log K), assuming uniform node distribution. If a quad-tree is used (e.g., see FIG. 2), we can choose a $C_a$ as follows. First, we find the cell where N locates and mark this cell as the searching box. If the number of nodes inside the searching box is less than K, we expand the searching box by including its adjacent cells. This process is repeated until the searching box contains at least K nodes. The number of nodes in the searching box can be approximated at O(K). Since each node is counted only once, finding the searching box costs O(K). Then, among these nodes, we find K−1 nodes that are nearest to N and set $C_a$ to be the MBC that bounds these K−1 nodes and N, and this computation has a cost of O(K log K). Thus, the total cost of this step is O(K log K).

After locating a $C_a$, we then determine $C_b$ and retrieve all nodes inside $C_b$. Let S be the set of these nodes and |S| the number of them. As the area of $C_b$ is 4 times of that of $C_a$, the number of nodes inside $C_b$ can be estimated as O(K), assuming uniform node distribution. Given $C_b$ and the set of nodes inside it, we now construct the candidates for $C_{min}$ and then select the one that has the smallest radius as $C_{min}$. Since $C_{min}$ is the minimum circle that contains N and at least K−1 other nodes (the MBC may contain more than K nodes when there are no less than 4 nodes on the border of the circle), there must have at least two nodes on the circle line of $C_{min}$. Thus, we can classify $C_{min}$'s candidates into two categories.

A candidate in the first category has exactly two nodes on its circle line. The candidate is the actually the circumscribed circle of the convex hull of the nodes inside. Thus, in this case, the two nodes must form a diameter of the candidate. Otherwise, there must exist a smaller circle which contains these nodes. Such candidates can be enumerated by considering all possible pairs of the nodes inside $C_b$. Given a pair of nodes, we construct the circle with the two nodes as its diameter. The circle is a valid candidate if it contains N and at least K−1 other nodes. Among all valid candidates, we find the one that has the smallest diameter. Let this candidate be C. Given a set of nodes S, there are totally $$\binom{|S|}{2}$$

different pairs of nodes. In addition, it takes O(K) time to verify a candidate contains at least K nodes. Thus, the computational cost in this step is $O(K^3)$.

A candidate in the second category has at least three nodes on its circle line. Note that any three nodes can form a triangle in a two-dimension domain (as long as they are not on the same line), and a triangle can form only one circumscribed circle. Thus, we can enumerate all possible triple nodes in S. For each triple, we construct the circumscribed circle formed by the three nodes. If the circle contains N and at least K−1 other nodes, it is a valid candidate. Again, among all valid candidates, we find the one that is smallest. Let this candidate be C. Since the number of possible triples is $$\binom{|S|}{3},$$

the computation cost in this step is $O(K^4)$.

Finally, we compare C with C', and the smaller one is $C_{min}$. Since the total cost of the entire process is $O(K)+O(K^3)+O(K^4)+O(K^4)$, the above algorithm finds $C_{min}$ in a polynomial time.

5. Trajectory Cloaking

For continuous LBSs, a user needs to report a base trajectory $T_0 = \{c_1, c_2, \ldots, c_n\}$. In response, the anonymity server will compute a new trajectory $T = \{C_1, C_2, \ldots, C_n\}$ that can provide the user K-anonymity protection. For this purpose, T must cover $T_0$. In addition, it must also cover footprints from at least K−1 trajectories (from different users), which we will refer to as additive trajectories. Let these trajectories be $T_1, T_2, \ldots, T_{K-1}$, and $T_j = \{a_{[j,1]}, a_{[j,2]}, \ldots, a_{[j,m_j]}\}$, where $1 \leq j \leq K-1$ and $m_j$ denotes the number of footprints in $T_j$. We give a formal definition of K-anonymity trajectory (KAT) as follows.

Definition 1: T is a KAT of $T_0$, iff for each circle $C_i$ in $T_0$, the following conditions are satisfied:
1) $C_i$ covers $c_i$ in $T_0$, i.e., $c_i \subseteq C_i$;
2) $C_i$ covers at least one footprint in each additive trajectory;
3) For any $C_i$ and $C_{i+1}$, there exist two footprints $a_{[j,x]}$ and $a_{[j,y]}$ in each additive trajectory $T_j$ such that $a_{[j,x]} \subseteq C_i$, $a_{[j,y]} \subseteq C_{i+1}$, and x<y.

Figure 4:
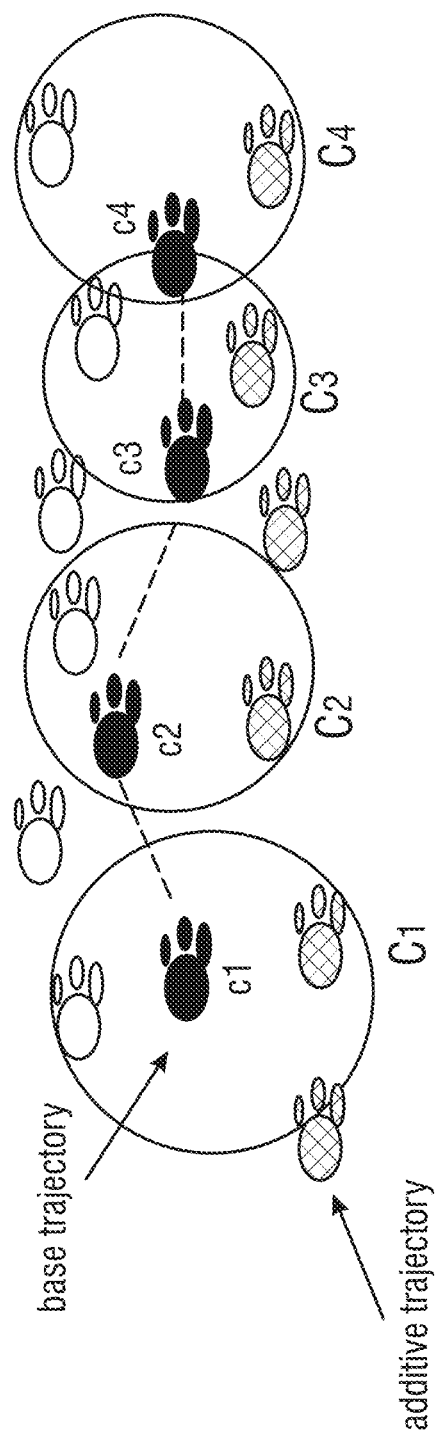
FIG. 4 provides an example of a K-anonymity trajectory.

The first two conditions ensure that each circle in T covers at least K location samples, each in a different trajectory. Given an additive trajectory $T_j$, it is not necessary to have all of its footprints covered by T in order to provide K-anonymity protection to $T_0$. Instead, we just need to make sure that T covers at least n footprints that are in the same order as they appear in $T_j$. The third condition in the above KAT definition is to guarantee this requirement. FIG. 4 illustrates an example of KAT, where K=3.

Given a trajectory $T = \{C_1, \ldots, C_n\}$, we define its resolution to be $$|T| = \frac{\sum_{i=1}^{n} \text{Area}(C_i)}{n},$$

where Area($C_i$) denotes the area of spatial region $C_i$. For quality of services, a KAT's resolution needs to be as fine as possible. Given a database of N trajectories, there are $$\binom{N}{K-1}$$

different trajectory sets with cardinality K−1. For each of these sets, its K−1 trajectories can be used as the additive trajectories to cloak base trajectory $T_0$. Given a set of K−1 additive trajectories, different orders of cloaking will also result in different KATs. Enumerating all possible combinations allows us to find the KAT with the best cloaking resolution, but this would require intensive computation. In the following subsections, we first discuss how to cloak $T_0$ with one trajectory, and then apply the proposed algorithm to cloak $T_0$ with a set of K−1 trajectories. Finally, we discuss how to select a small set of trajectories for cloaking from a potentially large number of trajectory candidates.

5.1. Cloaking One Additive Trajectory

Consider cloaking $T_0$ with an additive trajectory $T_a$. Let $T_0 = \{c_1, c_2, \ldots, c_n\}$, $T_a = \{a_1, a_2 \ldots, a_m\}$, where n≤m, and $T = \{C_1, C_2, \ldots, C_n\}$ be the cloaking result. For each circle $C_i$ in T, it needs to contain $c_i$ and at least one footprint in $T_a$. Thus, to minimize cloaking area, we can set $C_i$ to be the minimum bounding circle (MBC) that contains $c_i$ and some footprint in $T_a$. When a footprint in $T_a$ is selected to create the MBC for $C_i$, we call this footprint $C_i$'s pivot. Because of the ordering constraint of KAT, not every footprint in $T_a$ can serve as $C_i$'s pivot. To circumvent this problem, we can create a set of pivots by selecting n footprints from $T_a$ and using them as pivots based on their index number as follows. Let this set of n footprints be $\{a_{p_1}, a_{p_2}, \ldots, a_{p_n}\}$, where $p_1 < p_2 < \ldots < p_n$; then for all 1≤i≤n, $a_{p_i}$ is used as $C_i$'s pivot. The cloaking trajectory generated by this approach must be a KAT. The first two conditions are satisfied because $C_i$ is the MBC that bounds $c_i$ and its pivot, a footprint selected from $T_a$. The third condition is also satisfied because the pivots included in T are in the same order as they appear in $T_a$.

The challenge is how to select a set of pivots that can result in the best cloaking resolution. Given a set of pivots $\{a_{p_1}, a_{p_2}, \ldots, a_{p_n}\}$, we have T={MBC($c_1,a_{p_1}$), MBC($c_2,a_{p_2}$), ..., MBC($c_n,a_{p_n}$)}, where MBC($c_i,a_{p_i}$) denotes the minimum bounding circle that bounds $c_i$ and $a_{p_i}$. To find T with the best resolution, we can find all different sets of pivots, and for each set, compute the corresponding T's resolution. Since there are totally $$\binom{m}{n}$$

different sets of pivots, such exhaustive search may not be feasible in practice. To address this problem, we develop a simple yet effective approach to generate pivots for each $C_i$, starting from i=1, as follows. For $C_1$, we select its pivot from the following m−n+1 candidates: $a_1, a_2, \ldots,$ and $a_{m-n+1}$. For each candidate, we compute the MBC that bounds this candidate and $c_1$. The candidate that results in the smallest MBC is then selected as $C_1$'s pivot $a_{p_1}$. Let $a_{p_1}$ be the footprint selected as $C_1$'s pivot, where 1≤$p_1$≤m−n+1. Then, we select $C_2$'s pivot from the following m−n+2−$p_1$ candidates: $a_{p_1}+1, \ldots,$ and $a_{m-n+2}$. Again, for each of these candidates, we compute the MBC that bounds this candidate and $c_2$, and then select the one with the smallest MBC as $C_2$'s pivot. Suppose $a_{p_2}$ is selected as $C_2$'s pivot, where $p_1+1$≤$p_2$≤m−n+2. We then select $C_3$'s pivot from the following m−n+3−$p_2$ candidates: $a_{p_2+1}, \ldots,$ and $a_{m-n+3}$, based on their corresponding MBCs (with $c_3$). The same procedure is used to select the pivot for each of the rest of the circles in T. The complexity of this heuristic algorithm is O(m).

Figure 5:
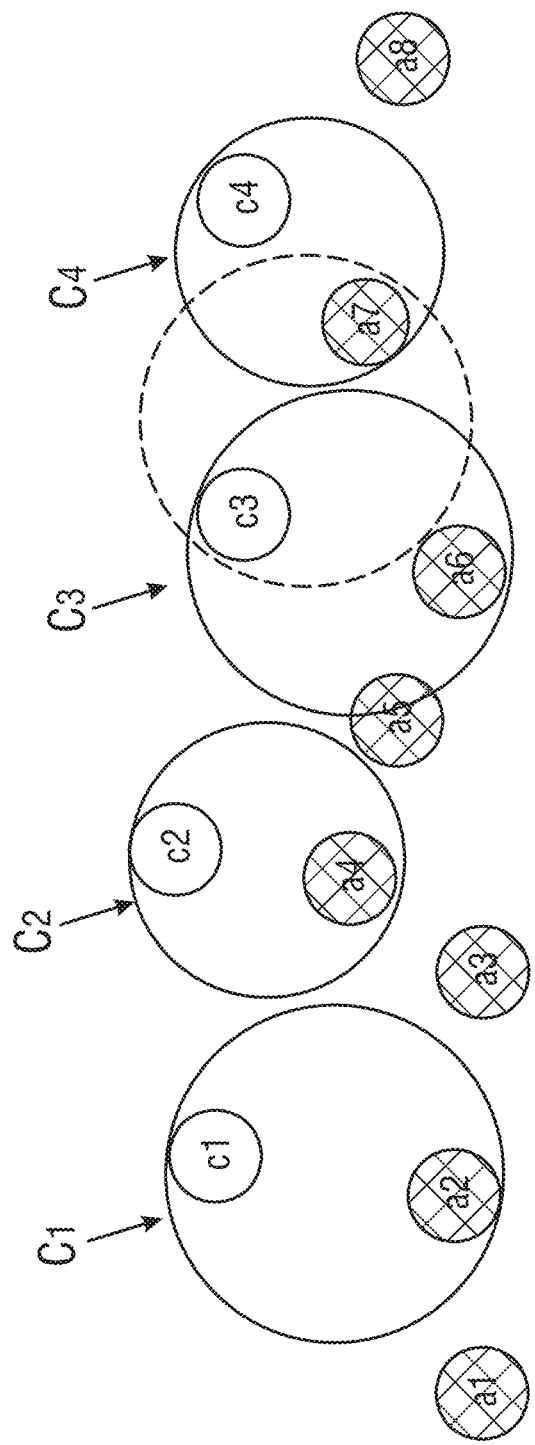
FIG. 5 illustrates an example of cloaking $T_0$ with $T_a$.

When determining a pivot, it is possible that multiple candidates result in the same smallest MBC. In this case, the one with the smallest index is chosen as the pivot. This would give more candidates choices when selecting the next pivot. It is worth mentioning that the above procedure selects each pivot from a certain range of footprints in $T_a$. For $C_1$, its pivot is selected from $T_a$'s first m−n+1 footprints. For all i>1, $C_i$'s pivot is selected the range from $a_{p_{i-1}}+1$ to $a_{m-n+i}$. The pseudo code of the cloaking procedure Cloak($T_0,T_a$) is given Algorithm 1. To illustrate this process, we use an example shown in FIG. 5. $T_0$ and $T_a$ have 4 and 9 location samples, respectively. For $C_1$, its pivot can be selected from $a_1$ to $a_6$. Since MBC($c_1,a_2$) is the smallest, $a_2$ becomes $C_1$'s pivot. For $C_2$, we can then select its pivot from $a_3$ to $a_7$. After selecting $a_4$ as $C_2$'s pivot, we proceed to select $C_3$'s pivot, which has four candidates ranged from $a_5$ to $a_8$. Note that $a_6$ is chosen as the pivot although MBC($c_3,a_6$) and MBC($c_3,a_7$) have the same size. As a result, $C_4$ can have two candidates, $a_7$ and $a_8$, to select its pivot.

---

Algorithm 1 Cloak ($T_0$, $T_a$)

---

1: p ← 0
2: for 1 ≤ n do
3:     M ← ∞
4:     for p < i ≤ m − n + j do
5:         if M > Area(MBC($c_j$, $a_i$)) then
6:             M ← Area(MBC($c_j$, $a_i$))
7:             p' ← i
8:         end if
9:     end for
10:    $C_j$ ← Area(MBC($c_j$, $a_{p'}$))
11:    p ← p'
12: end for
13: T ← {$C_1$, $C_2$, ..., $C_n$}

---

5.2. Cloaking K−1 Additive Trajectories

With Cloak($T_0,T_a$) in place, we now consider how to generate a KAT for $T_0$, given a set of additive trajectories S. Let $S = \{T_1, T_2, \ldots, T_s\}$, where s≥K−1, and let $T_i = \{a_{[i,1]}, a_{[i,2]}, \ldots, a_{[i,m_i]}\}$, where 1≤i≤s and $m_i$ denotes the number of footprints in $T_i$. To generate a KAT for $T_0$, we need to cloak $T_0$ with K−1 additive trajectories. Clearly, choosing different additive trajectories can have vastly different cloaking results. Even with a fixed set of K−1 additive trajectories, the order of cloaking can also affect the cloaking resolution of the cloaking results.

To avoid exhaustive search, we propose two heuristic approaches, Linear and Quadratic. The former incurs less computation costs, but the latter can lead to better cloaking results. Linear works as follows. For each trajectory $T_i$ in S, it calls Cloak($T_0,T_i$) to generate a cloaking trajectory, which we will denote as $T'_i$. If $T'_i$ has a better resolution than $T'_j$, we say $T_i$ is closer to $T_0$ than $T_j$. The trajectories in S are then sorted based on their distance to $T_0$ in ascending order, and the first K−1 trajectories (which are closest to $T_0$) are selected as $T_0$'s additive trajectories. Let these sorted trajectories be $T''_1, \ldots, T''_{K-1}$, where $T''_i$ is closer to $T_0$ than $T''_j$ for all 1≤i<j≤K−1. The K−1 trajectories are then used to cloak $T_0$ one by one recursively. Specifically, $T_0$ is first cloaked with $T''_1$. The cloaking result is considered as a new base trajectory and cloaked with $T''_2$. The new cloaking result is then cloaked with $T''_3$ and so on so forth until all K−1 trajectories are added. We call this algorithm Linear as it calls Cloak($T_0$, $T_i$) s+K−1 times. Its pseudo code is given in Algorithm 2.

---

Algorithm 2 Linear($T_0$, S)

---

1: {S = {$T_1$, $T_2$, ..., $T_s$}}
2: for 1 ≤ i ≤ s do
3:    $T_i'$ ← Cloak($T_0$, $T_i$)
4:    calculate |$T_i'$|
5: end for
6: S' ← Sort S in ascending order based on distance to $T_0$
7: T ← $T_0$
8: {Suppose S' = {$T_1''$,$T_2''$,...,$T_s''$}}
9: for 1 ≤ i ≤ K − 1 do
10:    T ← Cloak(T, $T_i''$)

-continued

Algorithm 2 Linear($T_0$, S)

11: end for
12: return T

In Linear, additive trajectories are selected based on their distance to $T_0$. The distance also determines the order of cloaking. This simple strategy falls short in some cases because it does not consider the spatial relationships among the additive trajectories. This problem is addressed by Quadratic at a higher computation cost. This scheme also has K−1 iterations, and in each iteration, it selects a new additive trajectory to cloak the trajectory, say T, which is generated in the previous iteration. However, the selection of the new additive trajectory is based on its distance to T, instead of $T_0$. Initially, T is set to be $T_0$. In each iteration, it calls Cloak(T,$T_j$) for each $T_j$ in S. Among all generated trajectories, the one with the best resolution is set to be T, and the corresponding $T_j$ is removed from S. After repeating this cloaking and selecting process K−1 times, T is output as $T_0$'s KAT. In the above approach, procedure Cloak($T_0$,$T_a$) is called $$(K-1)\left(s - \frac{K-2}{2}\right)$$

times. The pseudo code for Quadratic is given in Algorithm 3.

Algorithm 3 Quadratic ($T_0$, S)

1: {S = {$T_1$, $T_2$, ..., $T_s$}}
2: T ← $T_0$
3: for 1 ≤ i ≤ K − 1 do
4:    for all $T_j$ ∈ S do
5:       $T_j'$ ← Cloak(T, $T_j$)
6:       calculate |$T_j'$|
7:    end for
8:    compare |$T_j'$| for all $T_j$ ∈ S
9:    T" ← the trajectory that is closest to T
10:   T ← Cloak(T, T")
11:   S ← S − T"
12: end for
13: return T 5.3. Selecting Additive Trajectory Candidates In both Linear and Quadratic, the entire set of trajectories S is scanned in the process of selecting K−1 additive trajectories. Since the number of trajectories recorded in the footprint database can be very large, it is necessary to create a small set of additive trajectory candidates before starting a cloaking process. Obviously, only those trajectories close to the base trajectory should be considered as the candidates. In our implementation, we use the following approach to build a set of additive trajectory candidates given a base trajectory $T_0$. We first find out all cells that overlap with $T_0$'s location samples. These cells are marked as searching boxes. According to their cell tables, we then retrieve the trajectories that traverse through all of these cells. If the total number of these trajectories is less than K−1, we expand the search scope by merging each searching box and its adjacent cells together as a new searching box. For the new searching boxes, we retrieve the set of trajectories that pass through them. This process is repeated until the cardinality of the trajectory set is at least K−1, which are then chosen as the additive trajectories to generate KAT. Suppose it takes i rounds to find a sufficient number of additive trajectories. The searching box of each location sample in $T_0$ would contain $(2i-1)^2$ cells. Given n location samples in $T_0$, at most $(2i-1)^2 n$ cells will be accessed in the processing of selecting additive trajectories, wherein the maximal value $(2i-1)^2 n$ incurs when the n searching boxes do not overlap.

6. Performance Study

In this section, we evaluate the performance of the proposed techniques. We modify the Network-based Generator of Moving Objects [4] to generate mobile nodes and simulate their movement on the real road map of Oldenburg, Germany, a city about 15×15 $km^2$. We extract four types of roads from the road map, primary road (interstate expressway), secondary road (state road), connecting road and neighborhood road as defined in census TIGER/Line [1]. In our simulation, mobile nodes change their speeds at each intersection based on a normal distribution determined by the road type. The mean speeds and the standard deviations of moving speeds for each road type are listed in Table I. We generate a footprint database that contains a certain number of trajectories with randomly assigned user IDs. These trajectories are indexed using the grid-based approach discussed in the system overview section.

For single location sample cloaking, we compare our techniques with a basic scheme that cloaks using real-time neighbors' location information; for trajectory cloaking, we evaluate the proposed two approaches, namely Linear and Quadratic. We are mainly interested in the potential impact of a cloaking technique on the quality of LBSs. For this purpose, we select cloaking range, defined to be the average radius of cloaking circles in a KAT, as our performance metric.

TABLE I

TRAFFIC PARAMETERS

| Road type | Mean speed | Standard deviation |
| --- | --- | --- |
| Primary | 100 km/h | 20 km/h |
| Secondary | 60 km/h | 15 km/h |
| Connecting | 45 km/h | 10 km/h |
| Neighborhood | 30 km/h | 5 km/h |

6.1. Single Location Sample Cloaking

Figure 6:
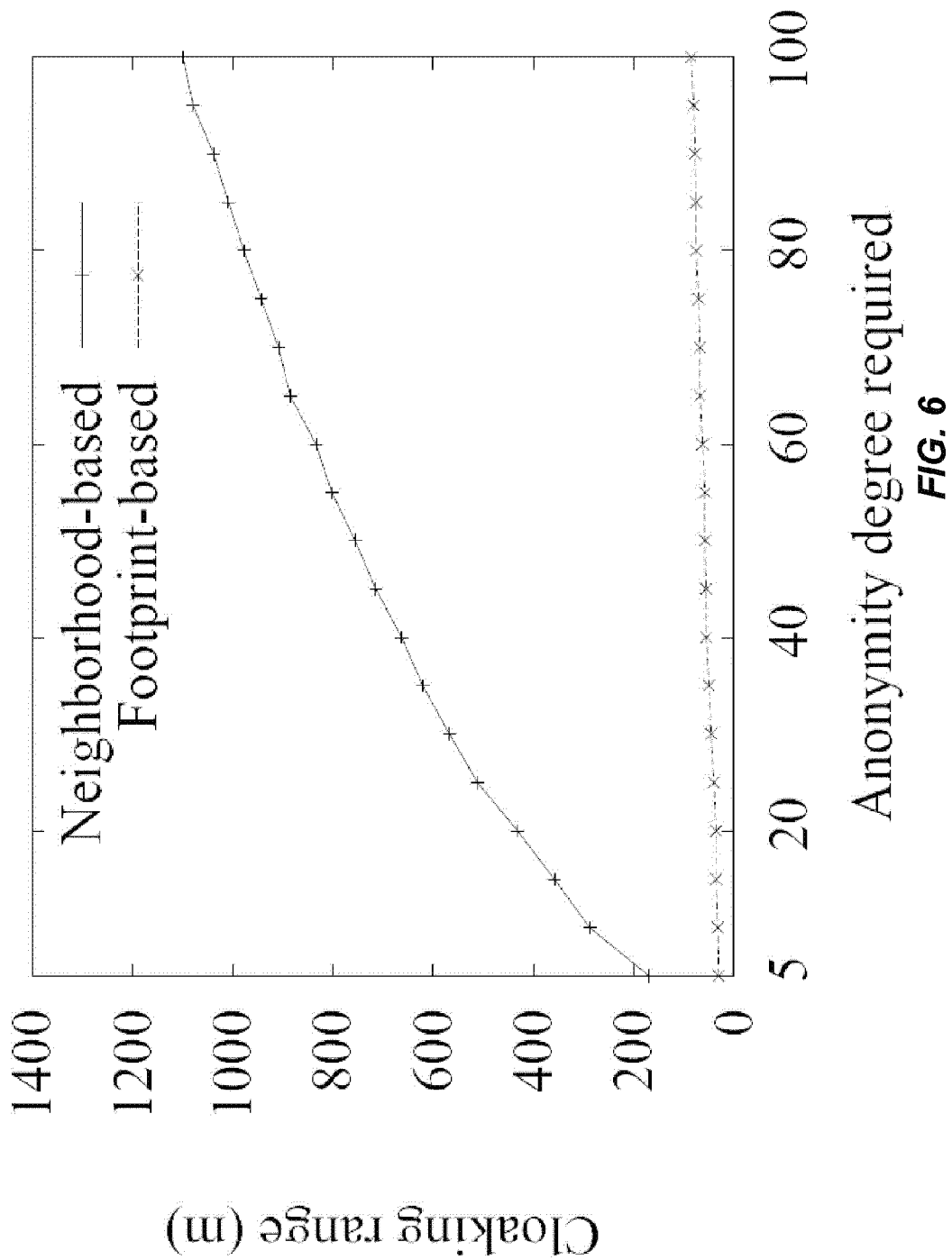
FIG. 6 illustrates the effect of anonymity requirement for single location cloaking.

In this study, we compare the performance of two schemes, footprint-based cloaking (FC) and neighborhood-based cloaking (NC). The former is what we propose, whereas the later is a basic approach that cloaks a node's position based on the location of its current neighboring nodes. In each simulation, we generated 5000 mobile nodes and randomly distributed them in the map. We randomly selected 200 mobile nodes, each submitting a service request. We varied the value of K from 5 to 100, and investigated the impact of anonymity requirement (i.e., the value of K, as requested by users) on the performance of the two techniques. The performance results are plotted in FIG. 6. It shows that NC performs many times worse than FC. In particular, as K increases, the average cloaking range under NC increases dramatically. In this scheme, a larger value of K means more mobile nodes need to be included in a cloaking circle. Since the users are randomly distributed in the network, the average size of cloaking circles increases proportionally with respect to the increase of K. In contrast, the performance of FC is much less sensitive to the value of K, because the size of a cloaking circle is determined by the number of different footprints that can be found nearby. As the figure shows, the average size of cloaking circles computed with this scheme at K=100 is less than that by FC at K=5. Since the size of a cloaking circle determines the quality of a LBS a user receives, cloaking with footprints can provide a desired level of anonymity protection, yet have a significant less impact on the providers of LBSs, as compared to the tradition approach.

6.2. Trajectory Cloaking

For trajectory cloaking, we evaluate the performance of the two proposed techniques. For comparison purpose, we have also implemented a Baseline approach, which uses the current position of mobile nodes for cloaking. Given a node N, this scheme finds the MBC that contains N and at least K−1 others and uses it as N's first cloaking circle. Among the nodes in the circle, K−1 nodes that are nearest to N are selected as N's companies. From then on, each time N makes a location update, Baseline finds the MBC that contains N and these K−1 companies and reports this MBC as N's cloaking circle. For each simulation, we generate a set of LBS requests. Each request contains a user's ID, the start and destination of a travel plan, and a required anonymity degree. The start and destination are randomly selected from the neighborhood areas in the map, and the fastest path between them is picked as the user's expected route. We select a location sample every 100 meters along the route and these samples form the user's base trajectory. Other parameters used in our study are given in Table II. In the following subsections, we report how the performance of the three techniques is affected by various factors.

TABLE II

EXPERIMENT SETTINGS

| parameter | range | default | unit |
| --- | --- | --- | --- |
| Number of users | 5000 | 5000 | unit |
| Anonymity level | 10-20 | 15 | unit |
| Trajectory database size | 100K-300K | 200K | unit |
| Base trajectory length | 3K-8K | 5K | meter |
| Service request number | 200 | 200 | unit |
| Minimum cell size | 50 × 50 | 50 × 50 | Meter$^2$ |

Figure 7A:
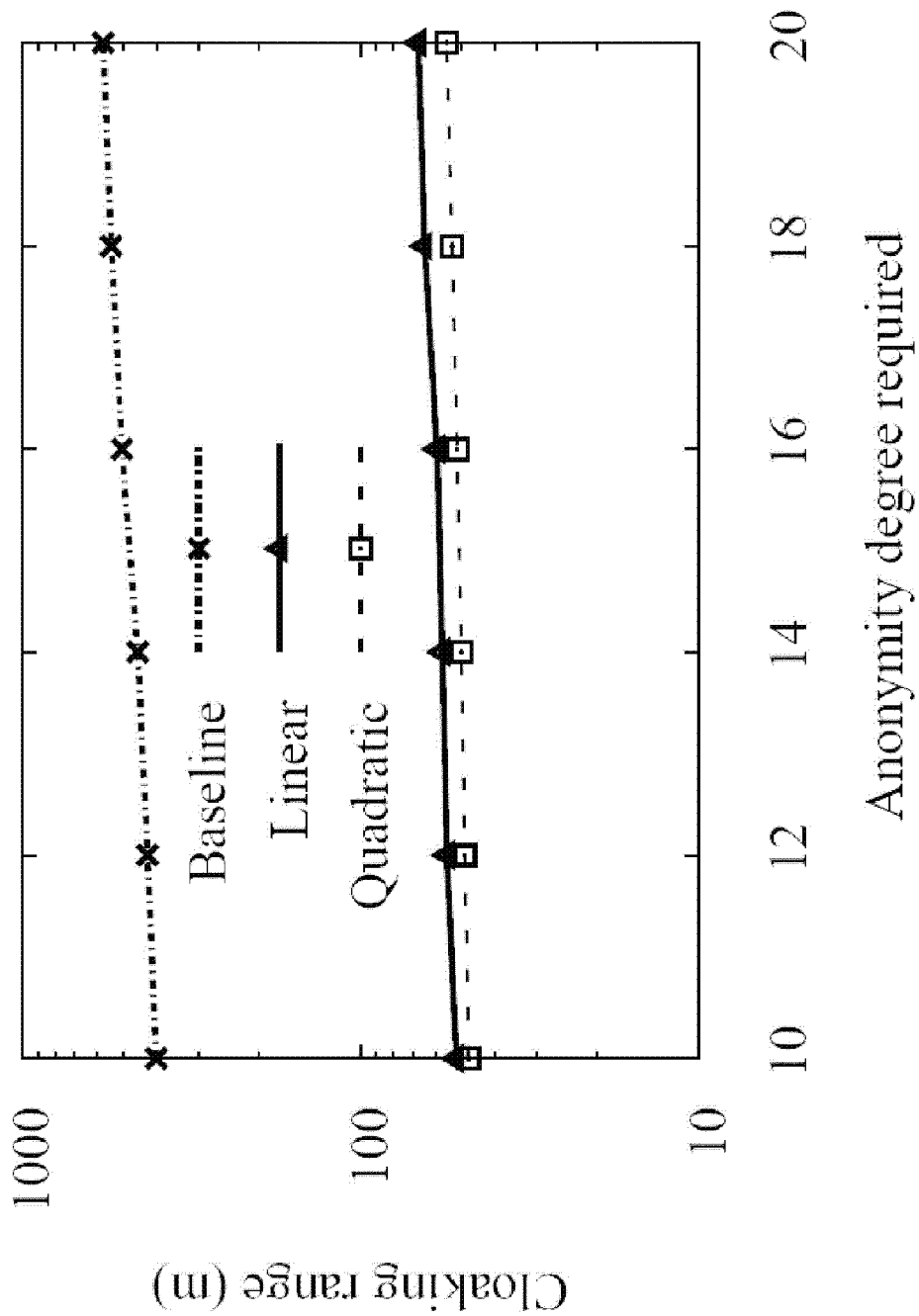
FIGS. 7A and 7B illustrate the effect of the anonymity requirement.

1) Effect of anonymity level required: In this study, we investigated the impact of anonymity requirement (i.e., the value of K, as requested by users) on the performance of the three techniques. The footprint database used in this study contains 200,000 trajectories. We generated 200 service requests, each having a route of 5000 meters with 500 meters deviation. The value of K is varied from 10 to 20. The performance results are plotted in FIG. 7. When K increases, the average cloaking range under all schemes increases, as shown in FIG. 7A. However, Baseline always results in the largest cloaking ranges, about 10 times more, as compared to the other two. Given a service user, Baseline needs to ensure that all cloaking circles generated for the user include a common set of K nodes. Since these nodes may move on different directions, the cloaking range becomes increasingly large. When K is larger, the cloaking results also deteriorate quicker. As for the other two schemes, FIG. 7A shows that Quadratic always outperforms Linear. This, however, is achieved at a more computation overhead.

Figure 7B:
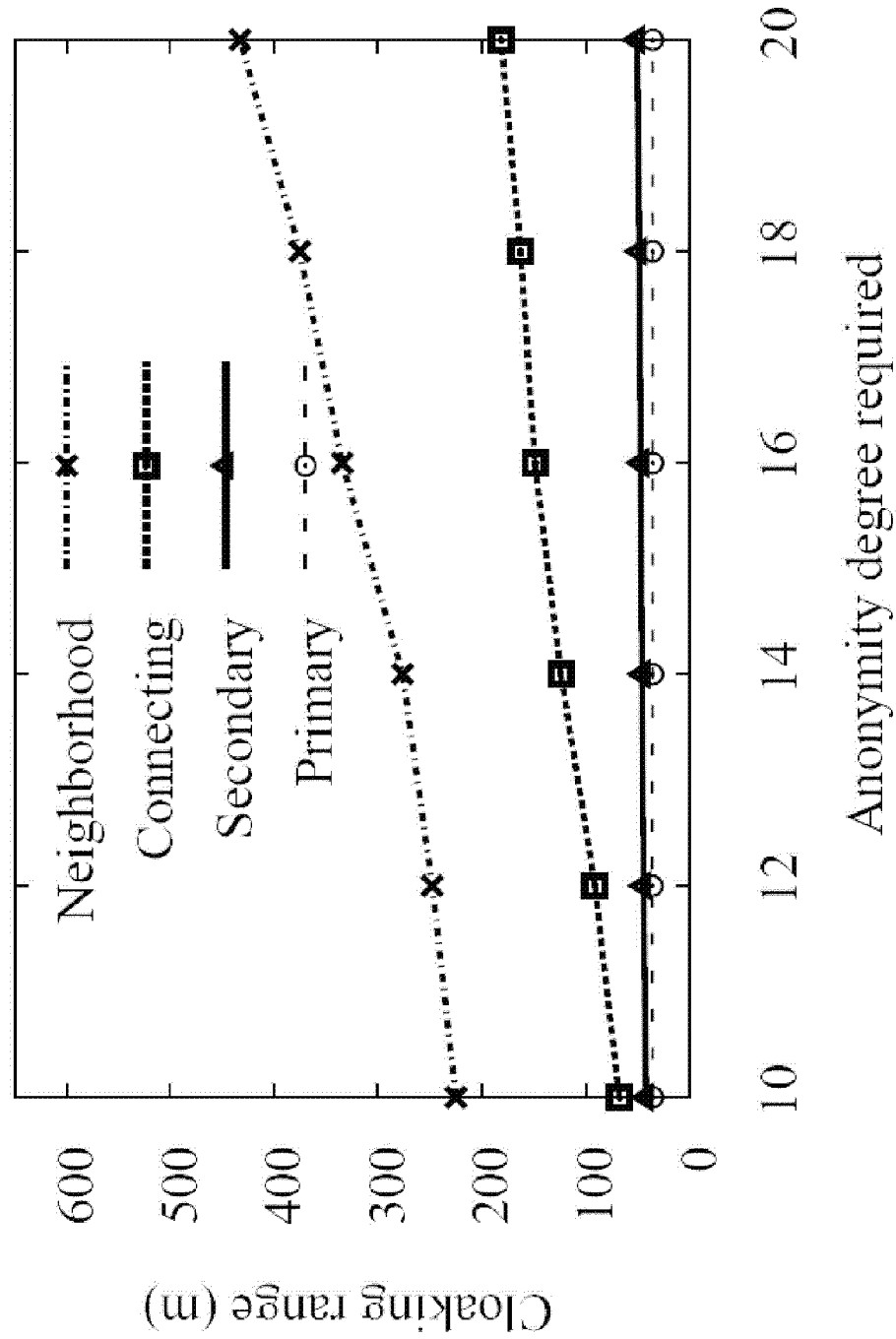

FIG. 7B shows the average cloaking range on different types of roads. The primary and secondary roads are popular. A small space on such roads may have a large number of footprints from different users. Thus, the cloaking range is not very sensitive to the value of K. As the figure shows, the corresponding two curves are almost flat. In contrast, the connecting roads and neighborhood roads are less popular and have a much less number of trajectories passing through them. When K increases, the average cloaking range increases sharply, since a cloaking trajectory may have to cover different roads in order to guarantee a sufficient level of anonymity protection. In reality, a user's route typically covers different types of roads, and a large portion of the route is on highways. Since it is the cloaking circles along these popular areas that dominate the average cloaking range, cloaking with footprints allows users to select a large K for anonymity protection while maintaining good cloaking results.

Figure 8A:
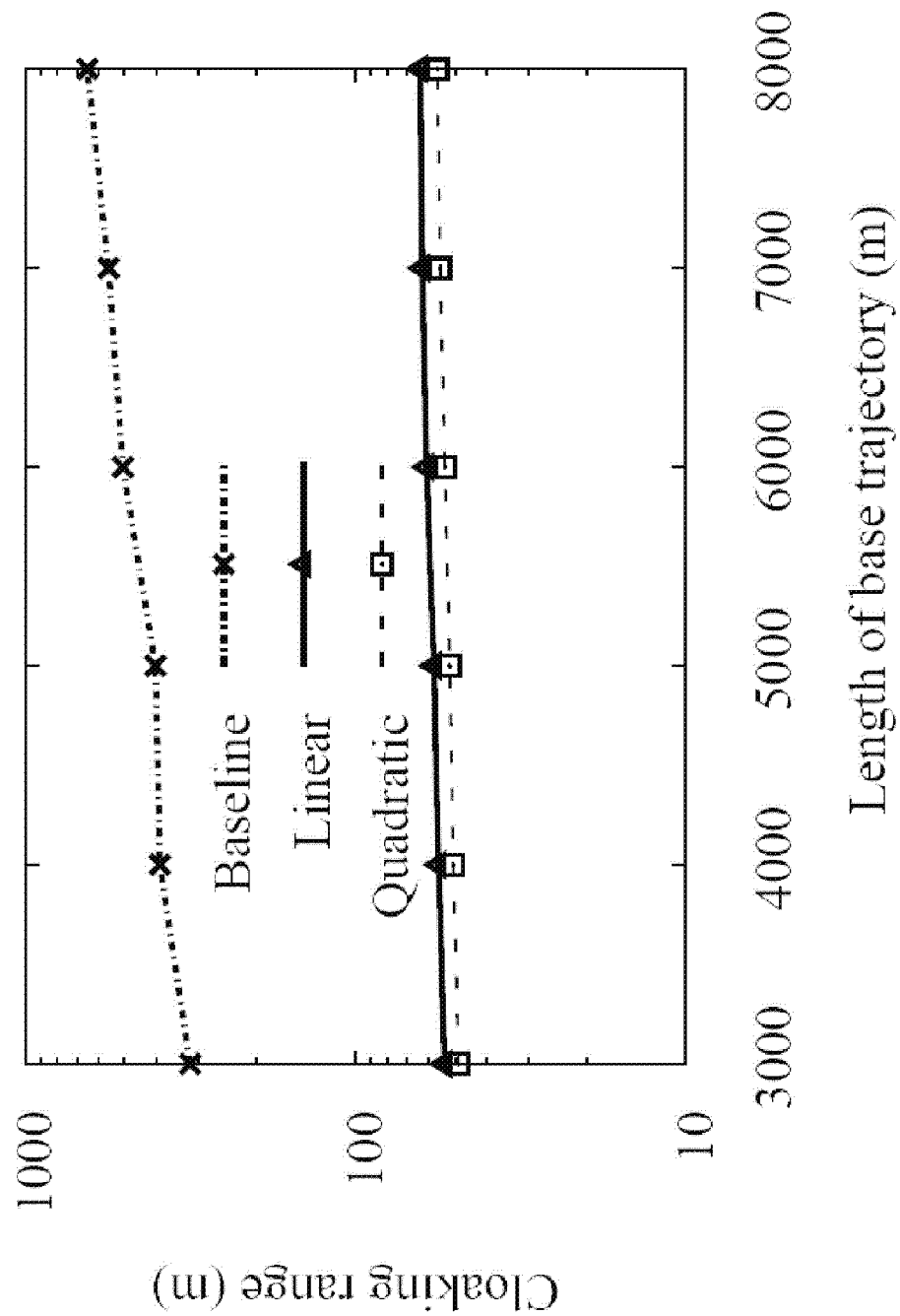
FIGS. 8A and 8B illustrate the effect of trajectory length.
Figure 8B:
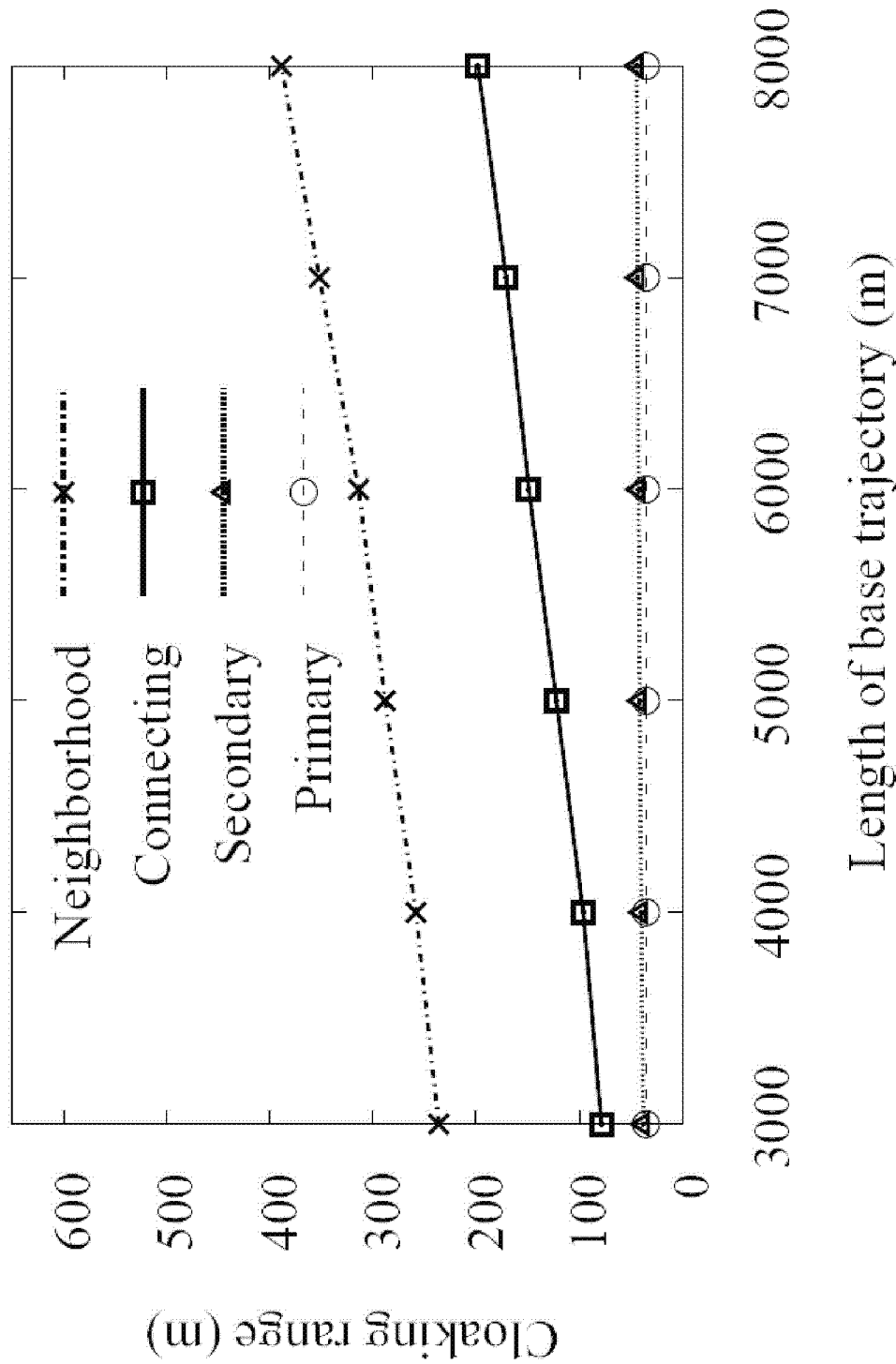

2) Effect of Base Trajectory Length: In this study, we investigated the impact of length of base trajectories on the performance of the three techniques. The footprint database used in this study contains 200,000 trajectories. In each simulation run, we set K=15 and generated 200 base trajectories. The average length of these base trajectories is varied from 3000 meters to 8000 meters. The performance results are shown in FIGS. 8A-8B. Under all three schemes, the average cloaking range increases as the trajectory length increases, as showed in FIG. 8A. However, Baseline performs much worse as compared to its counterparts. It is worth mentioning that the cloaking range under this scheme increases sharply as the base trajectory length increases. This again convinces that cloaking with neighbors' location is untenable for anonymity protection in continuous LBSs. As for Linear and Quadratic, both are little sensitive to the base trajectory length. As explained in the previous study, when a large portion of a user's trajectory is on highways, the cloaking circles on the highways determines the average cloaking ranges. Since our simulation uses the fastest path between a start and a destination as a user's route, when the user's base trajectory becomes longer, the increased portion is most likely on the highways. FIG. 8A also shows that Quadratic consistently outperforms Linear. In popular areas, base trajectories and their corresponding additive trajectories usually overlap each other, so the cloaking order does not have much impact on the cloaking results. FIG. 8B again shows that the average cloaking range on popular roads is much smaller than that on unpopular roads. Also, as base trajectories become longer, the cloaking range increases on unpopular roads, but remains almost constant on popular roads.

Figure 9A:
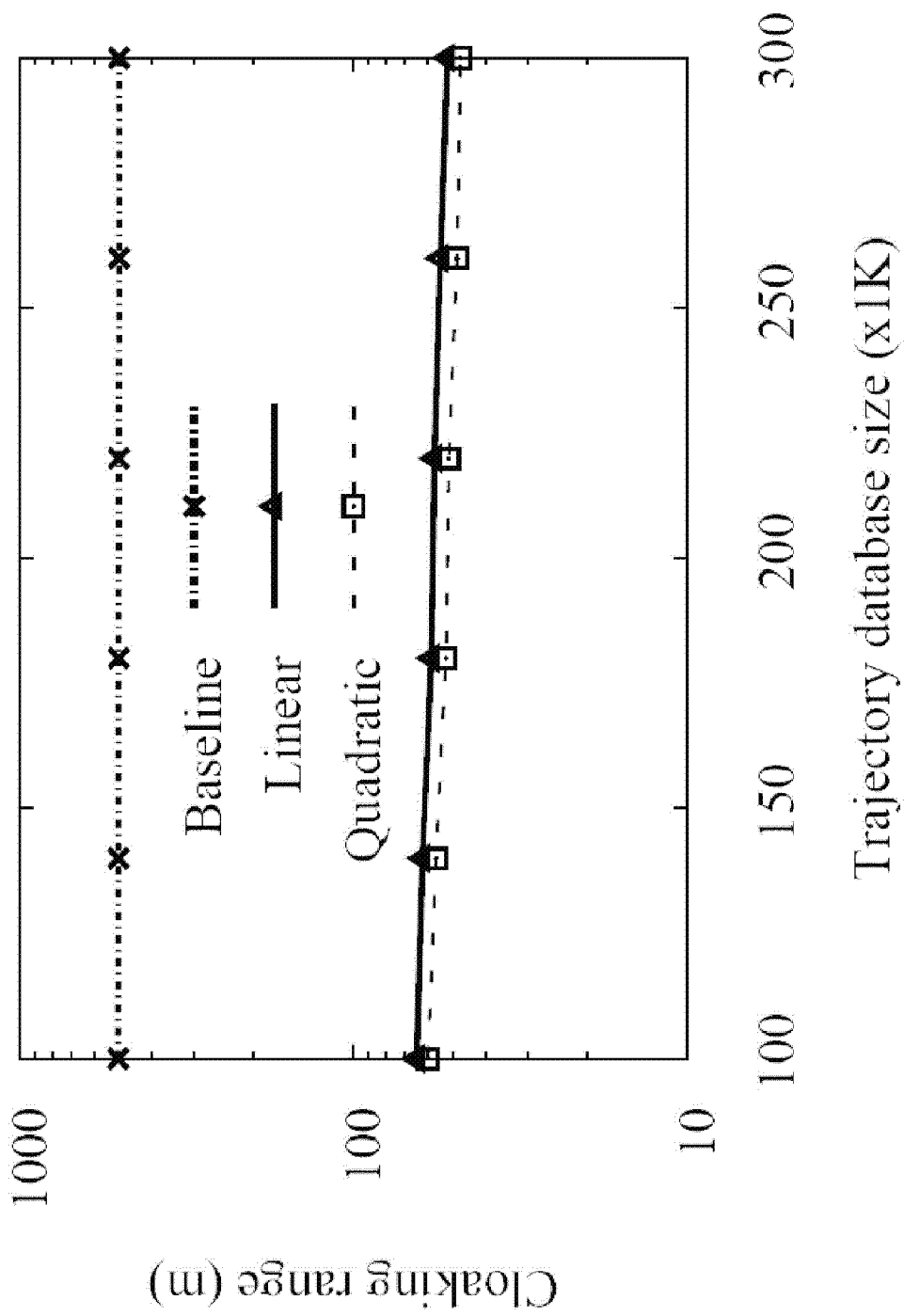
FIGS. 9A and 9B illustrate the effect of trajectory database size.
Figure 9B:
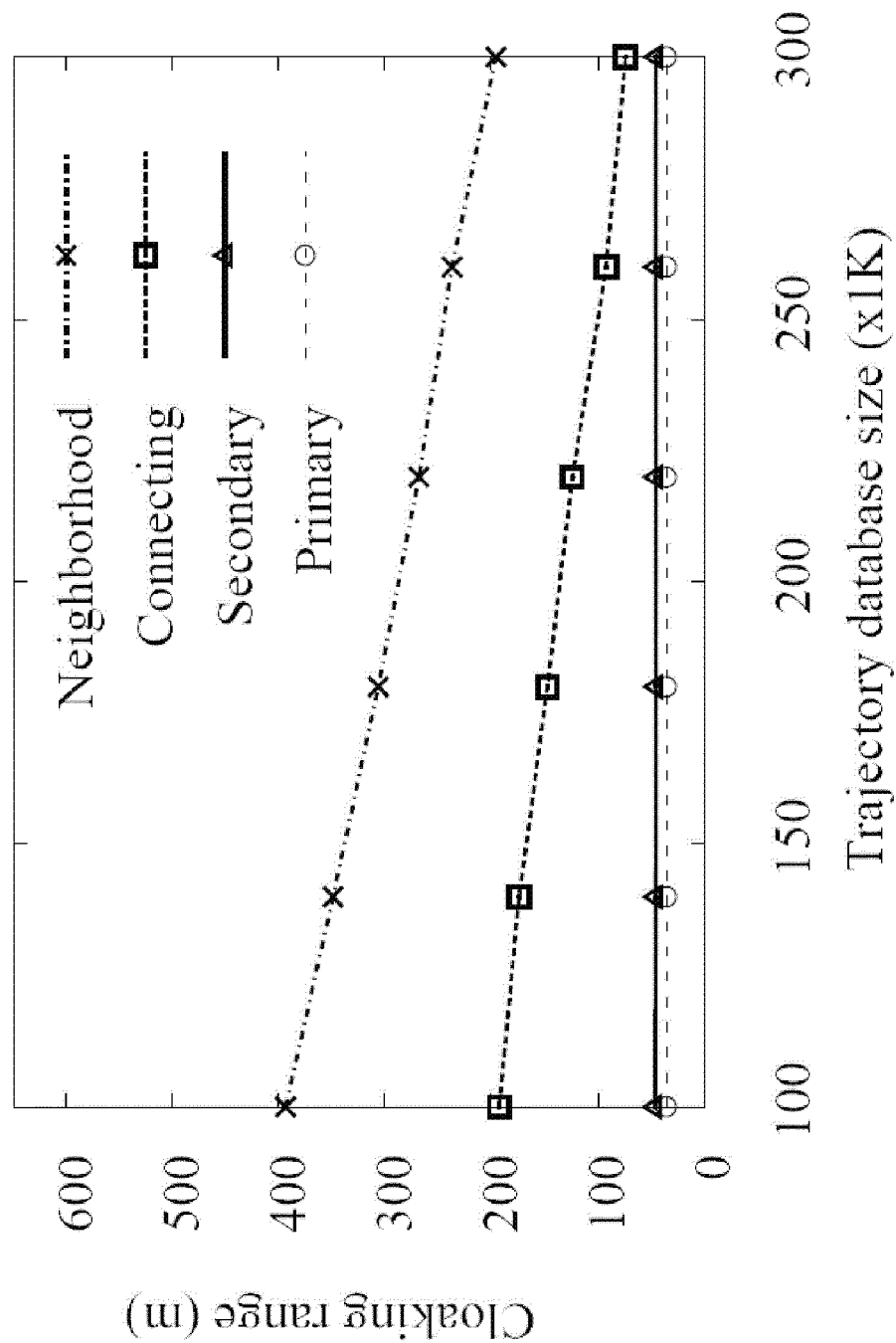

3) Effect of the number of historical trajectories: This study investigates the impact of the number of trajectories in the footprint database. We varied the number of trajectories in the database from 100,000 to 300,000. For each simulation, we generated 200 base trajectories, each averaged at 5000 meters with a deviation of 500 meters. We set K=15 for each service request. The performance results are plotted in FIGS. 9A-9B. It is shown in FIG. 9A that the curve for Baseline is flat. This is not a surprise since this scheme uses only the current position of mobile nodes for cloaking. As for Linear and Quadratic, both have better cloaking results when the database contains more trajectories. Clearly, more historical trajectories means more choices in selecting additive trajectory candidates for cloaking. With the same anonymity level, it can then find enough additive trajectories by searching in a smaller range for a base trajectory. Thus, the generated KATs have a smaller cloaking range. Since base trajectories can be added to the database for future cloaking, our proposed techniques will generate better cloaking results as more footprints are collected. This feature makes them especially attractive for large-scale anonymization services. FIG. 9B shows that the increase of the number of historical trajectories has a significant impact on the average cloaking range on unpopular roads, but not on popular roads. On the expressway or state roads, there is a sufficient number of footprints for cloaking, even when the database contains as few as 100,000 trajectories. In contrast, for the unpopular roads, adding some new trajectories could increase their popularity substantially.

7. Feeling-Based Privacy Model

An anonymous location disclosed for an LBS may be correlated with restricted spaces to identify a set of possible service requestors. The more popular a spatial region is, the more difficult it is for an adversary to single out the true requestor. A user can specify her desired level of protection by specifying a value of K: a spatial region disclosed on her behalf must have at least K different visitors Alternatively, a user can specify a public region and request that her disclosed location must be at least as popular as that space. An example of a public region can be some shopping mall in town. As compared to specifying a number of K, it is much more intuitive for a user to express her privacy requirement by identifying a spatial region which she feels comfortable is reported as her location should she request an LBS from it. We refer to this approach as feeling-based privacy modeling.

When a location is disclosed for an LBS on a user's behalf, it must be at least the same popular as the public region she specifies. The problem now is how to measure the popularity of a spatial region. The number of its visitor along is not sufficient to quantify its popularity, because some people may have a dominant presence in that space. If an LBS is requested from an office, then the office staff is more likely to be the service requestor, even if the office has many visitors. To address this problem, we borrow the concept of entropy from Shannon's information theory [24]. Suppose we can collect location samples from cellular phone users. These location samples, each called a footprint, can then be used to measure the popularity of a spatial region as follows.

DEFINITION 2. Let R be a spatial region and $S(R)=\{u_1, u_2, \ldots, u_m\}$ be the set of users who have footprints in R. Let $n_i (1 \le i \le m)$ be the number of footprints that user $u_i$ has in R, and $N=\Sigma_{i=1}^m n_i$. We define the entropy of R as $$E(R) = -\sum_{i=1}^{m} \frac{n_i}{N} \log \frac{n_i}{N},$$

and the popularity of R as $P(R)=2^{E(R)}$.

The value of E(R) can be interpreted as the amount of additional information needed for the adversary to identify the service user from S(R) when R is reported as her location in requesting an LBS. According to the above definition, we have $1 < P(R) \le m$. P(R) has the maximum value m when every user in S(R) has the same number of footprints in R. On the other hand, P(R) has the minimum value when a user in S(R) has N−m+1 footprints in R while each of the rest has only 1. We have the following two observations. First, P(R) is higher if m is larger. In other words, a region is more popular if it has more visitors. Second, P(R) has a lower value if the distribution of footprints is more skewed. If some users are dominant in the region, P(R) will be much less than m. In this case, R needs to be enlarged in order to have a required popularity.

Let R be a user's public region. When the user requests a sporadic LBS, where the request can be seen as an independent event, we can find a cloaking box that 1) contains the user's current position, 2) has a popularity that is no less than P(R), and 3) is as small as possible, and then report this box as the user's location. When the user requests a continuous LBS, a time-series sequence of cloaking boxes will be reported that form a trajectory. In this case, simply ensuring that each cloaking box has a popularity no less than P(R) does not protect the user's location privacy at her desired level. This is due to the fact that the adversary can narrow down the list of possible service users by finding the common visitors of these cloaking boxes. To prevent such attack, we must use the footprints of the common set of users, instead of all visitors of the regions, in computing the popularity of each cloaking box. We define the popularity of a spatial region with respect to a given set of users as follows.

DEFINITION 3. Given a spatial region R, and a user set $U=\{u_1, u_2, \ldots, u_{m'}\} \subseteq S(R)$, the entropy of R with respect to U is $$E_U(R) = -\sum_{i=1}^{m'} \frac{n_i}{N'} \log \frac{n_i}{N'},$$

where $n_i$ is the numbers of footprints that $u_i$ has in R, and $N'=\Sigma_{i=1}^{m'} n_i$. The popularity of R with respect to U is $P_U(R)=2^{E_U(R)}$.

When a sequence of cloaking boxes are generated on a user's behalf, we must ensure that the popularity of each cloaking box with respect to the common set of visitors is no less than that of the user's public region. In other words, the trajectory formed by these cloaking boxes must be a P-Popular Trajectory (PPT), which is formally defined below:

DEFINITION 4. Let $T=\{R_1, R_2, \ldots, R_n\}$ be a sequence of cloaking boxes generated for a user, and $S(R_i) (1 \le i \le n)$ the set of people who have footprints in $R_i$. We say T is the user's PPT if for each $R_i$, it satisfies that (1) $R_i$ covers the user's position at the time when $R_i$ is disclosed, and (2) $P_S(R_i) \ge P(R)$, where $S=\cap_{1 \le i \le n} S(R_i)$ and R is the public region specified by the user.

Given a trajectory $T=\{R_1, R_2, \ldots, R_n\}$, we define its resolution to be $$|T| = \frac{\sum_{i=1}^{n} \text{Area}(R_i)}{n},$$

where $\text{Area}(R_i)$ denotes the area of box $R_i$. For location privacy protection, a trajectory formed by the location samples disclosed on a user's behalf must be a PPT. Meanwhile, its resolution needs to be as fine as possible to guarantee the quality of the required LBS services. Following, we focus on how to generate such a PPT for a user to entertain a continuous LBS.

8. Trajectory Cloaking

We assume mobile clients communicate with LBS providers through a trusted central location depersonalization server (LDS) managed by the clients' cellular service carriers. For LBSs that require user authentication (e.g., for service charges), we assume anonymous authentication (e.g., [11], [23], [20]) is used. The carriers offer the depersonalization services as a value-added feature to their clients, and supply the LDS with an initial footprint database that contains location samples collected from their clients (e.g., through regular phone calls). These location samples will be used to compute the popularity of a spatial region and for trajectory cloaking. The database will be expanded with the location data obtained from mobile users in their requests of LBSs.

We assume each client configures her privacy requirement by specifying a public region. When a user requests an LBS, she also informs the LBDs a travel bound B, a rectangular spatial region that bounds her travel during the service session. In response, the LDS randomly generates a service session ID and contacts the service provider. After establishing a service session, the service user periodically reports her current location to the LDS. For each location update, the LDS computes a cloaking box which contains the service user's current location, and exports this box along with the session ID to the corresponding LBS provider. The information received from the provider is then forwarded back to the service user. As mentioned early, to prevent restricted space identification, the trajectory created by the sequence of cloaking boxes must be a PPT that satisfies the user's privacy requirement. The key issue is how to find a common set of users for cloaking so that the trajectory, which is undetermined, can have a resolution that is as fine as possible.

In the following subsections, we first describe the main data structure used for indexing the location samples stored in the footprint database, and then present a heuristic algorithm for trajectory cloaking.

8.1 Data Structure

Figure 10:
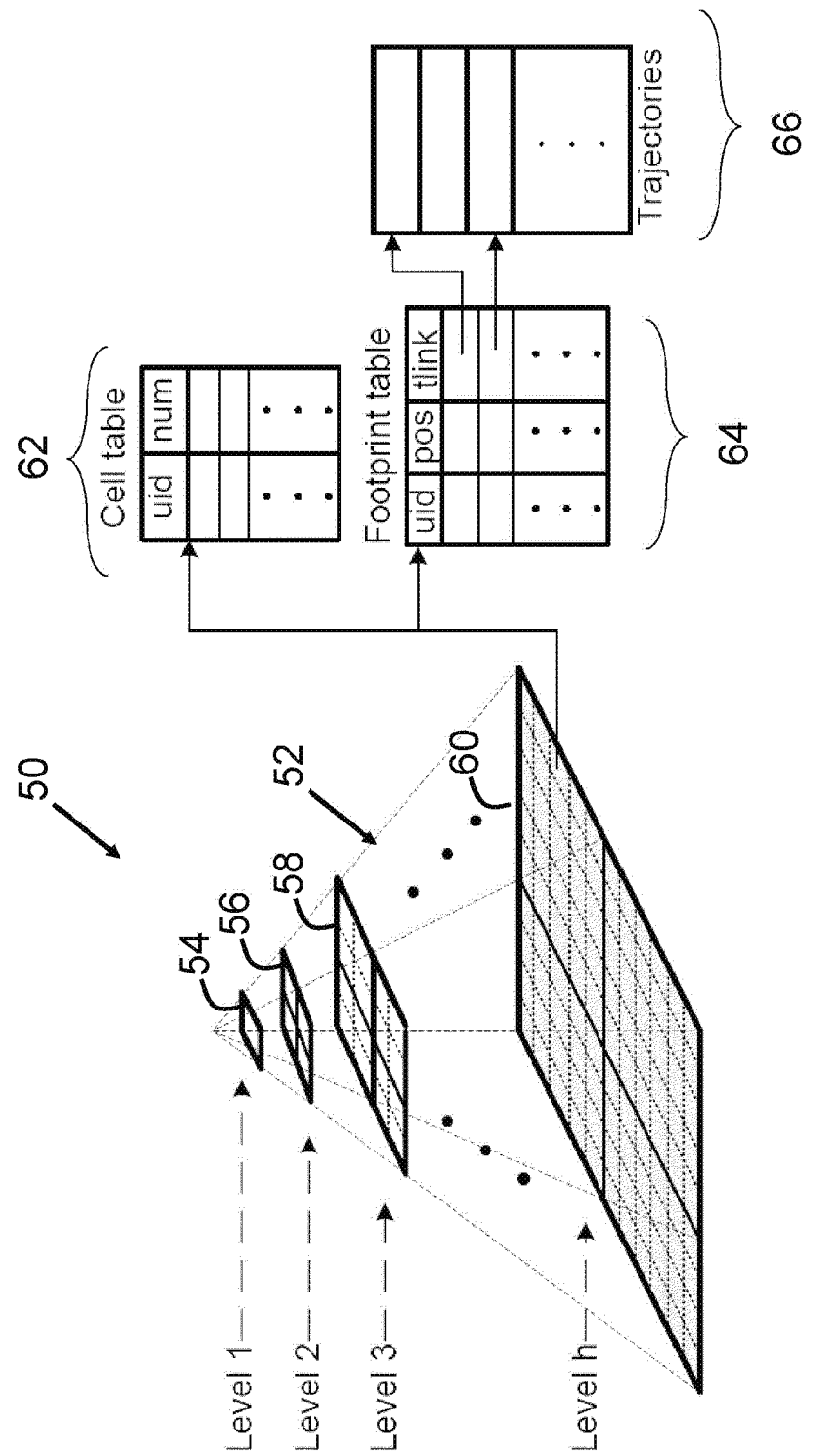
FIG. 10 illustrates a pyramid data structure.

We partition the network domain recursively into cells in a quad-tree style. The partitioning stops when the size of cells becomes less than a threshold (our implementation sets each cell to be at least 100×100 meter$^2$). All the cells generated in the partitioning form a pyramid structure as shown in FIG. 10. Suppose the partitioning stops at the h$^{th}$ recursion, then the pyramid has a height of h. The top level in the pyramid is level 1 and has only one grid cell that covers the whole network domain. Each grid cell except the ones at the bottom level is composed of four cells at the next lower level, which we refer to as its child cells.

Each cell at the bottom level h keeps a footprint table and a user table. The footprint table stores the footprints the cell contains, and each tuple of the table is a record of (uid, pos, tlink), where uid is the identity of the mobile user that a footprint belongs to, pos is the coordinates of a footprint, and tlink is a pointer that links to the corresponding trajectory stored in the database. The user table records the number of footprints a user has in the cell, and each tuple of the table is a record of (uid,num), where num is the number of footprints that the user has in the cell. For each cell at the bottom level, we also keep a user table, which is derived from the user tables corresponding to its four child cells.

FIG. 10 illustrates the data structure 50 with a pyramid 52 having a plurality of levels or layers, including a first level 54, a second level 56, a third level 58, and an h level 60. As previously discussed, each cell at the bottom level h keeps a cell or user table 62 and a footprint table 64. The footprint table 64 includes links to corresponding historical trajectories stored in the database 66.

8.3 Generating PPT

We now discuss how to generate a PPT for a service user. Given the user's public region R, the LDS computes its popularity P(R) using the cells at the bottom level that overlap with R. When the user makes the first location update, the server selects a set of users, which we will refer to as a cloaking set. The footprints of this set of users are then used for location cloaking whenever the service user makes a location update.

8.3.1 Selecting Cloaking Set

It may first appear that we can determine the cloaking set, denoted as S, by finding the set of users who have footprints closest to the starting point of the service user. This simple solution minimizes the size of the first cloaking box. However, as the service user moves, the users in S may not have footprints that are close to her current position. As a result, the size of the cloaking boxes may become larger and larger, making it difficult to guarantee the quality of LBS. Thus, when selecting the cloaking set, we should consider its affect on the cloaking of not only the user's first but all location updates in the LBS. But the challenge is that the service user's route is not predetermined, and thus the LDS cannot figure out whose footprints will be closer to the service user during her travel. To address this challenge, our idea is to find those users who have visited most places in the service user's travel bound B and use them to create the cloaking set. As these users have footprints spanning the entire region B, it will help generate a PPT with a fine resolution.

Figure 11:
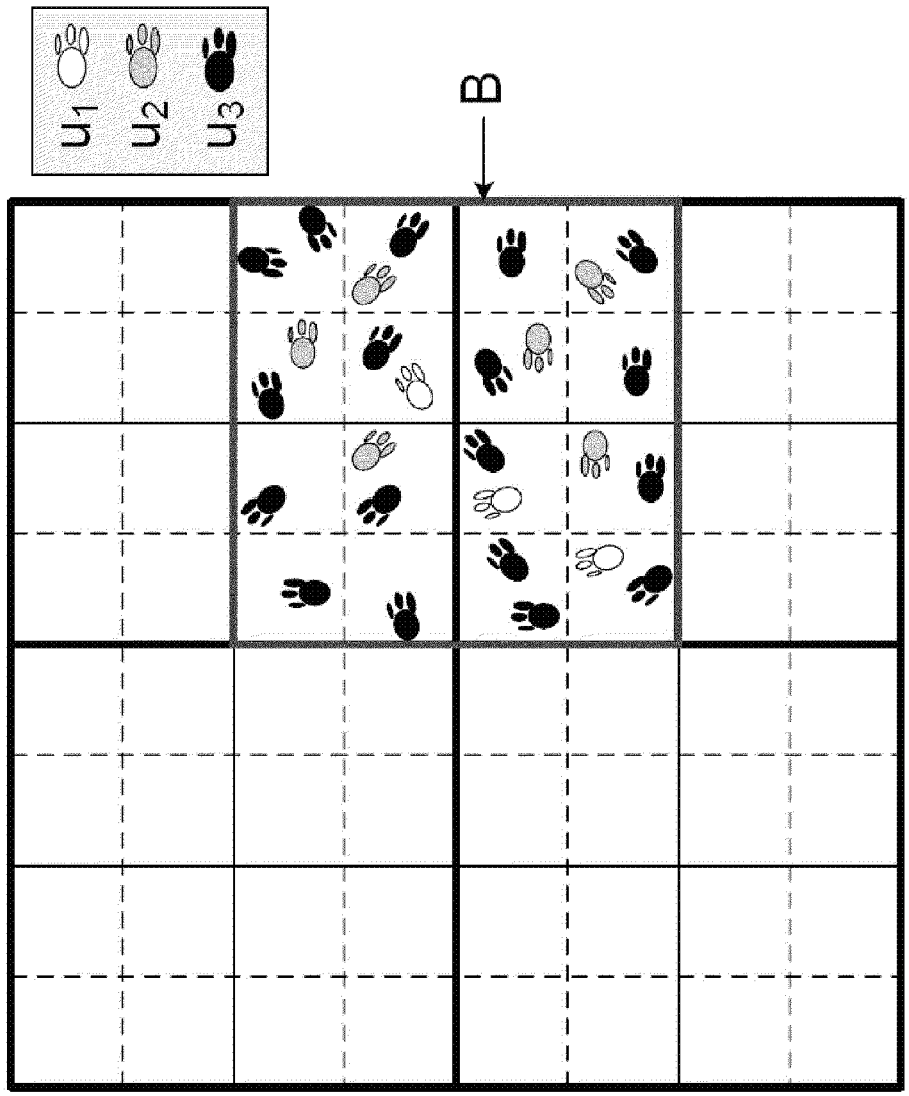
FIG. 11 illustrates an example of a travel bound with people of different popular level.

We say a user is l-popular within B, if she has footprints in every cell at level l that overlaps with B. According to the pyramid structure, cells at level with a larger l have a finer granularity. This implies that given an l-popular user, the larger the value of l is, the more popular the user is. FIG. 11 shows an example in which a network domain is partitioned into a 4-level pyramid (There are 1, 4, 16, 64 cells at each level respectively from top to bottom). It also shows a travel bound B and the footprints inside it. The footprints in different colors belong to different users. $u_1$, $u_2$, and $u_3$ are three 2-popular users within B because they have footprints in the two cells at level 2 of the pyramid which overlap with B; $u_2$, $u_3$ are two 3-popular users within B since they have footprints in all four cells at level 3 that overlap with B; only $u_3$ is 4-popular since she is the only one who has footprints in all the sixteen cells at level 4 that overlap with B.

Based on the above definitions, we now present a simple but effective algorithm that can find a cloaking set for trajectory cloaking. The pseudo code is given in Algorithm 4. In this algorithm, the LDS sorts the users in S(B) according to their popularity at level l, and selects the most popular users in S(B) as the cloaking set, starting from the bottom to top of the pyramid. Let $C_l$ denote the set of cells at level l in the pyramid, $C'_l$ the set of cells in $C_l$ that overlap with B, and $S_l$ the set of users who are l-popular within B. The LDS first finds $S_h$. Since level h is the bottom level, these users are the most popular users in S(B). To find $S_h$ (i.e., the users who have visited all the cells in $C'_h$), the LDS simply joins the user tables of these cells on column uid (line 6-7). Next, the LDS computes the popularity of B with respect to $S_h$ using their footprints in B. If the popularity $P_{S_h}(B)$ is less than P(R), it means that cloaking with the footprints of the users in $S_h$ cannot provide the desired level of privacy protection for the service user. In this case, the LDS considers the cells one level higher, i.e., level h−1 (line 9), and computes $S_{h-1}$ and $P_{S_{h-1}}(B)$ similarly. This procedure is repeated until at some level l the popularity $P_{S_l}(B)$ is no less than P(R). The complexity of this algorithm is determined by the cost of computing user set $S_l$ at each level from bottom to top. Let m denote the number of users in S(B) and k the number of cells in $C'_h$. Then, the cost of joining two user tables is O(m), and the cost of joining user tables at bottom level (i.e., computing $S_h$) is O(k·m). According to the pyramid structure, the number of cells at a certain level that overlap with B is about one fourth of those at the next lower level. Thus, the total cost of finding $S_l$ on all levels is O(k·m).

Algorithm 4 SelectCloakingSet(P(R), B)

```
1:  U ← ∅ {U keeps the cloaking set}
2:  l ← h
3:  while U ⊂ S(B) and P_U(B) < P(R) do
4:      {Get cells at layer l overlapping with B}
5:      C_l' ← Overlap( C_l,B )
6:      {Join user tables of C_l' by column uid}
7:      T ← Join(C_l',uid)
8:      U ← S_l ← T.uid
9:      l ← l − 1
10: end while
11: return U
```

The above algorithm checks the users level by level, from the bottom to top. If a user is l-popular within B, it must also be (l−1)-popular within B. Thus, each time the algorithm checks the cells at a higher level, the cloaking set is expanded to include more users. As long as P(R)≤P(B) (i.e., a user's public region is at most the same popular as that of her travel bound), the algorithm will find a sufficient number of visitors within B for the cloaking set. In the worst case, all users in S(B) are included in the cloaking set. On the other hand, if P(B)<P(R), the LDS does not need to find a cloaking set. It can simply compute a spatial region that contains B and has a popularity no less than P(R), and always report this region as the user's location as long as it moves inside B.

8.3.2 Computing Cloaking Boxes

During a service session, the service user updates a time-series sequence of locations. For each location update p, the LDS computes a cloaking box b using the footprints of users in the cloaking set U. We develop a heuristic algorithm which computes the cloaking box b as small as possible, and ensures that $P_U(b) \geq P(R)$. The pseudo code is given in Algorithm 5.

Given a location update p, the LDS first initializes the cloaking box b to p which is the smallest cloaking box only containing the service user herself. The LDS also initializes a searching box b' to the cell that contains p at level l where the cloaking set U is selected in Algorithm 5, since it contains footprints of all users in the cloaking set. Then, for each user in U, the LDS gets the set of her footprints $F_u$ which are inside b' but outside b, and in $F_u$ the LDS finds the closest one to p (line 7-8). Next, the LDS collects these footprints in set F, and computes the cloaking box b as the minimal bounding box (MBB) of the footprints in F (line 11). If b already contains all footprints of U in b', the LDS expands the searching box b' by merging itself with its adjacent cells at the bottom level (line 13-16). The above procedure is repeated until $P_U(b) \geq P(R)$, and the resulting cloaking box b is reported as the service user's location to the external service provider.

---

Algorithm 5 Cloak (p, P(R), U)

1: F ← ∅
2: l ← the level where U is determined
3: b ← p
4: b' ← the cell in $C_l$ that contains p
5: while $P_U(b) < O(R)$ do
6:     for all u ∈ U do
7:         $F_u$ ← the footprints of u in b' − b
8:         $f_u$ ← the closest footprint to p in $F_u$
9:         F ← F + {$f_u$}
10:    end for
11:    b ← M B B(F)
12:    if b contains all footprints of U in b' then
13:        {get cells at bottom level adjacent to b'}
14:        C' ← Adjacent(b',h)
15:        {merging the cells in C' with b'}
16:        b' ← b' ∪ C'
17:    end if
18: end while
19: return b

---

9. Performance Study

In this section, we evaluate the effectiveness of the proposed technique under various conditions using location data synthetically generated based on a real road map. For comparison purpose, we have implemented two other approaches. The first one, which we refer to as Naive, assumes the location updates made a service are independent to each other. For each location update, Naive just finds a cloaking box which satisfies the three conditions as previously described at the beginning of Section 3, and reports it as the service user's location in her service request. Note that this scheme may not protect a user's location privacy at her desired level when she makes a time-series sequence of location updates. The second approach is referred to as Plain hereafter. This scheme determines the cloaking set for the service users by finding the footprints closest to her start position. After fixing the cloaking set, Algorithm 5 is applied to compute the cloaking boxes for the service user during her entire service session. To ease our presentation, we will refer to our proposed technique as Advanced.

We modify the Network-based Generator of Moving Objects [4] to generate mobile nodes and simulate their movement on the real road map of Oldenburg, Germany, a city about 15×15 $km^2$. We extract four types of roads from the road map, primary road (interstate expressway), secondary road (state road), connecting road and neighborhood road as defined in census TIGER/Line [1]. In our simulation, mobile nodes change their speeds at each intersection, and the moving speed on a road follows a normal distribution determined by the road type. The mean speeds and the standard deviations of moving speeds on all road types are listed in Table 3. We generate a footprint database that contains a certain number of trajectories, and we assign them to 2000 users. The number of trajectories each user has follows a normal distribution with a standard deviation 0.1. These trajectories are indexed using the grid-based approach discussed in Section 3.1. For each simulation, we generate a set of LBS requests. Each service request contains a user's ID, a public region, and a travel bound. The start position are randomly selected within the travel bound, and the service user moves randomly in the travel bound, i.e., when she arrives at an intersection, she randomly chooses a direction to move on. We assume a user's travel distance is proportional to the size of the travel bound, and she makes a location update every 100 meters when she moves. Other parameters used in our study are given in Table 4. Unless otherwise specified, the default values are used.

In our study, we are mainly interested in the following two performance metrics. One is cloaking area, defined to be the average area of cloaking boxes in a cloaking trajectory. The other one is privacy level. Given a cloaking trajectory, we measure its protection level using the ration between the average popularity of its cloaking boxes with respect to the common set of users who have visited all of them and the popularity of the user specified public region. Clearly, the protection level must be at least 1, otherwise the cloaking trajectory fails to protect the service user's location privacy at the required level. In the following subsections, we report how the performance of the three techniques is affected by various factors.

TABLE 3

Traffic parameters

| Road type | Mean speed | Standard deviation |
|---|---|---|
| Primary | 100 km/h | 20 km/h |
| Secondary | 60 km/h | 15 km/h |
| Connecting | 45 km/h | 10 km/h |
| Neighborhood | 30 km/h | 5 km/h |

TABLE 4

Experiment Settings

| Parameter | Range | Default | Unit |
|---|---|---|---|
| Number of users | 2000 | 2000 | unit |
| Public region size | 50-250 | 150 | meter |
| Trajectory database size | 100K-300K | 200K | unit |

TABLE 4-continued

Experiment Settings

| Parameter | Range | Default | Unit |
|---|---|---|---|
| Travel bound size | 2-6 | 4 | km |
| Travel distance | 2-6 | 4 | km |
| Service request number | 200 | 200 | unit |
| Minimum cell size | 100 × 100 | 100 × 100 | meter$^2$ |

9.1 Effect of Privacy Requirement

Figure 12A:
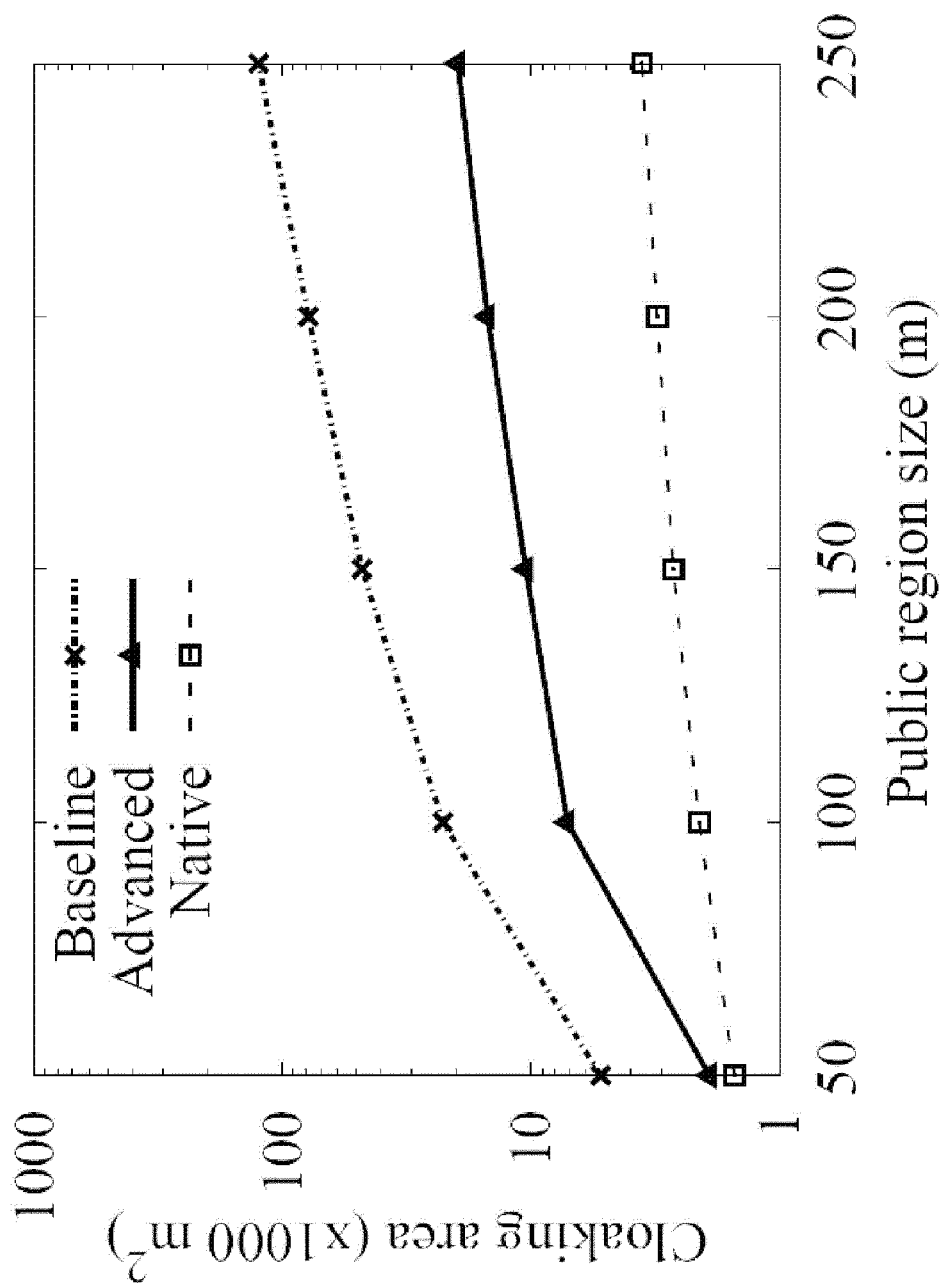
FIGS. 12A-12F illustrate the impact of system parameters on performance.
Figure 12B:
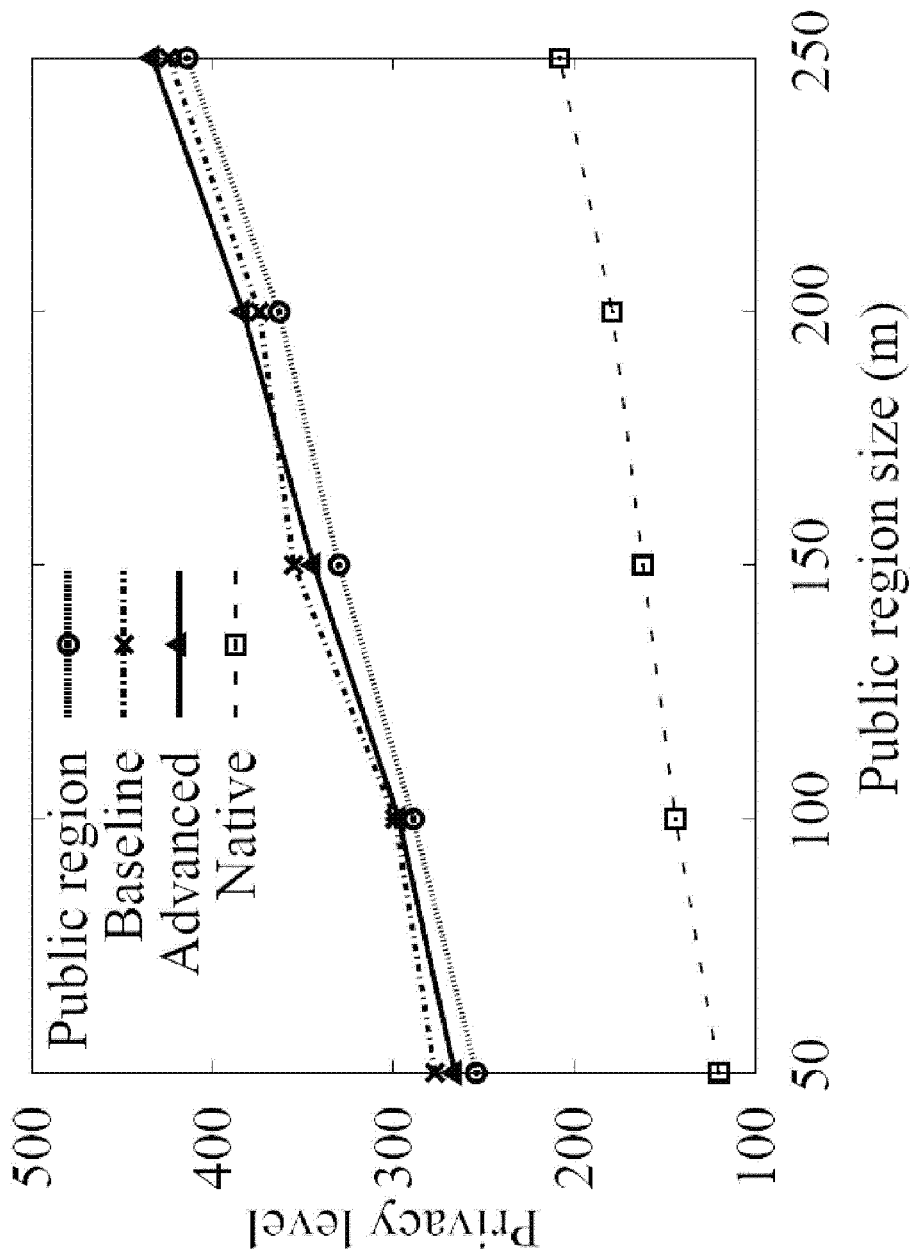

This study investigates the impact of privacy requirement (i.e., the popularity of the public region specified by a service user) on the performance of the three techniques. We generated 300 service requests. Each request has a travel bound of a 4×4 km$^2$ square region, and the travel distance of the corresponding user during her service session is 4 km. Each service user specifies her public region as a square region which contains her start position. The size of the public region, measured by the side length of the square, is varied from 50 to 250 meters. The performance results are plotted in FIGS. 12A and 12B. FIG. 12A shows that when the size of the public region increases, the average cloaking area under all the three schemes increases. This is due to the fact that a larger public region is likely to contain more people's footprints and have a larger popularity. To satisfy a higher level of privacy requirement, a cloaking box needs to be larger to include more people. This study also shows that Plain always has a much larger cloaking area as compared to the other two approaches. This scheme does not take user popularity into consideration when selecting a user's cloaking set. When some unpopular users are selected in a cloaking set, the cloaking boxes generated for the future movement of a service user will become larger in order to contain all users in the cloaking set. On the other hand, Native has the smaller cloaking area. This scheme does not consider the correlation of the cloaking boxes in a trajectory, just cloaking each location with a bounding box that is as small as possible and has a popularity no less than that of the public region. The problem is, simply ensuring that each cloaking box satisfies the privacy requirement does not protect the service user's privacy at her desired level. This is confirmed in FIG. 12(b). It shows that the protection level of Naïve is constantly lower than 1. As for Plain and Advanced, they both guarantee that the actual protection level is no less than required.

9.2 Effect of Travel Distance

Figure 12C:
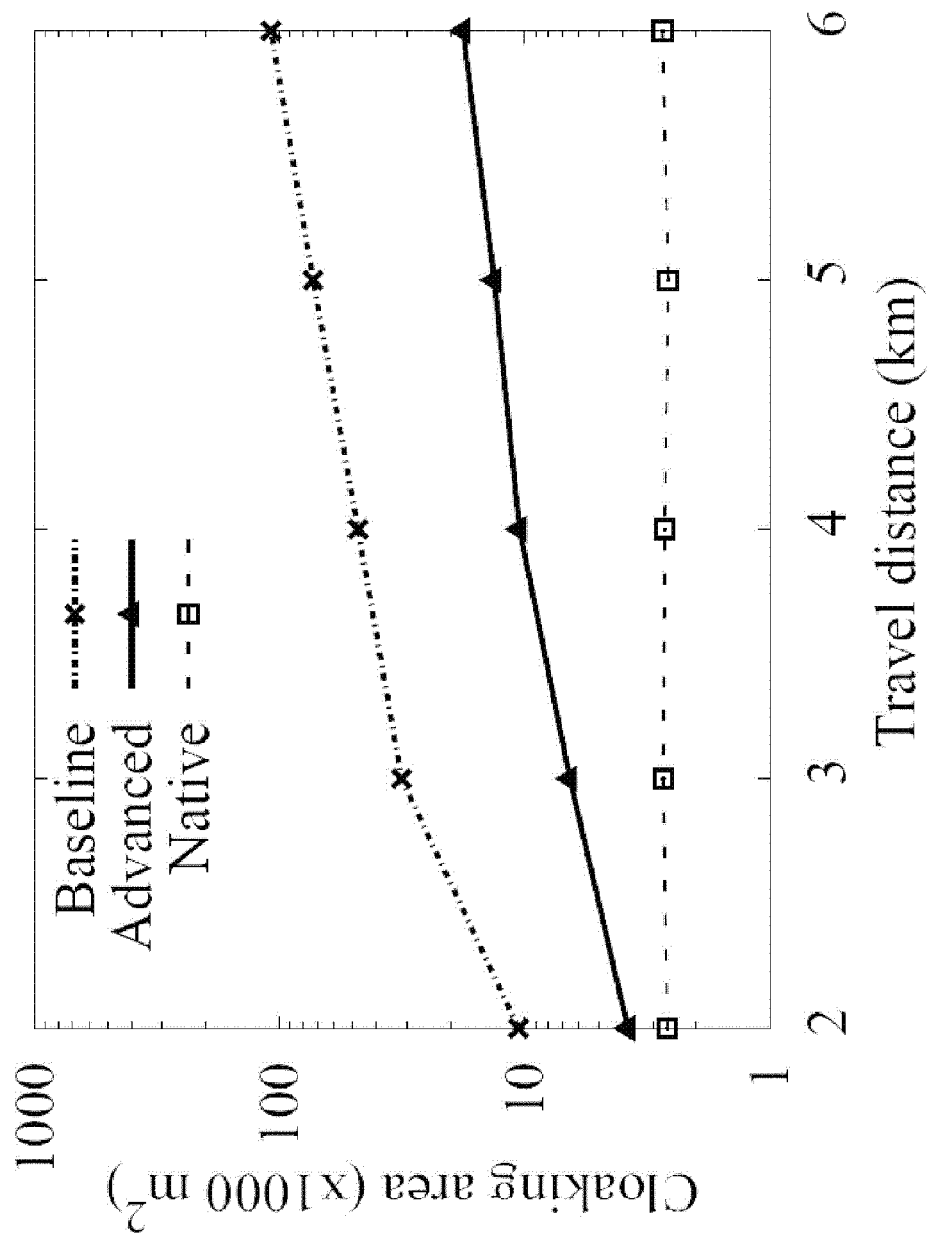
Figure 12D:
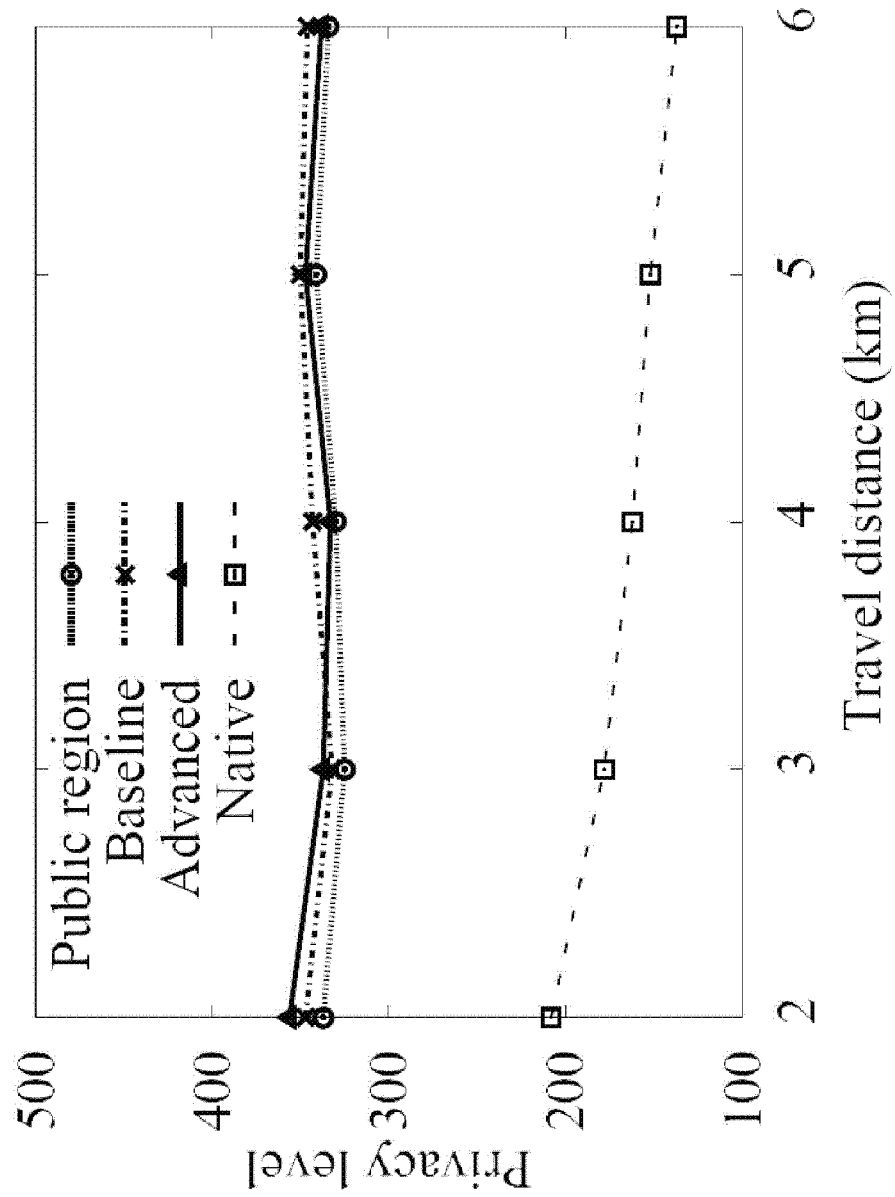

In this study, we investigated the impact of travel distance on the performance of the three techniques. In each simulation run, we set public region as a 150×150 m$^2$ square, and generated 300 service requests. The travel distance is varied from 2 km to 6 km, and accordingly the side length of travel bound is varied from 2 km to 6 km. The performance results are shown in FIGS. 12C and 12D. FIG. 12C shows that under both Plain and Advanced, the average cloaking area increases as the travel distance increases. However, Plain performs much worse than Advanced. The reason behind is explained as follows. When the travel distance is larger, the trajectory of the service user tends to traverse through a larger region. With an unpopular user in a cloaking set, it is more difficult to find their footprints close for each location in the trajectory. Plain performs worse because in average it includes more unpopular users in a cloaking set. On the other hand, the cloaking area under Native remains almost constant as the travel distance changes. It is due to the fact that Native assumes each location update is an independent event. For each location update, it simply finds the nearest footprints to cloak. As such, the cloaking area is irrelevant to the number of location updates in the trajectory. Again, this approach cannot be used for location privacy protection when a user has to report her location periodically in a service session. FIG. 12D shows the protection level of Naive decreases as the travel distance increases. Since each location update is cloaked independently in Naive, a longer cloaking trajectory tends to have a lesser number of users who have visited all cloaking boxes in the trajectory, and thus has a lower popularity with respect to this common set of users. In contrast, the privacy level of neither Plain nor Advanced is much affected by the variance of travel distance.

9.3 Effect of Footprint Database Size

Figure 12E:
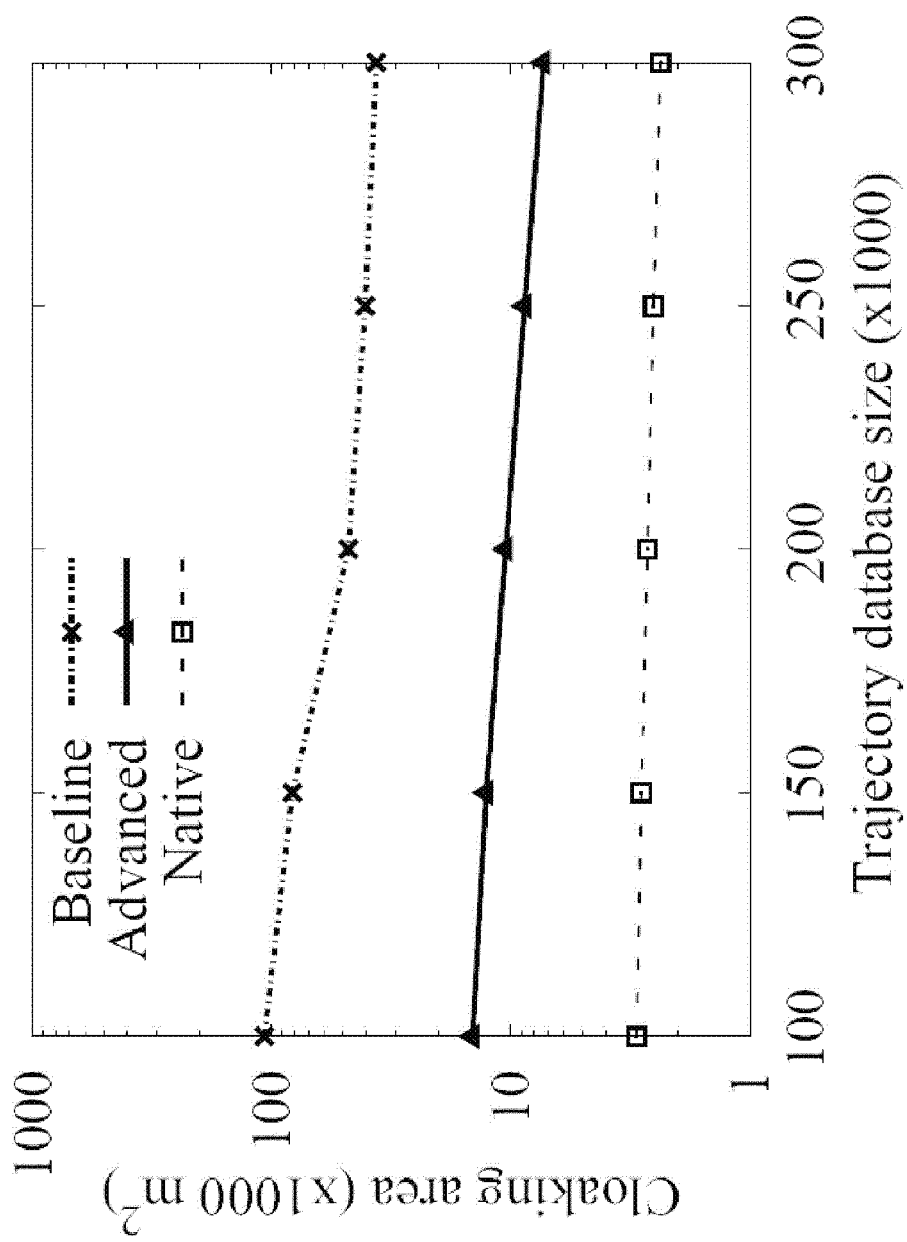
Figure 12F:
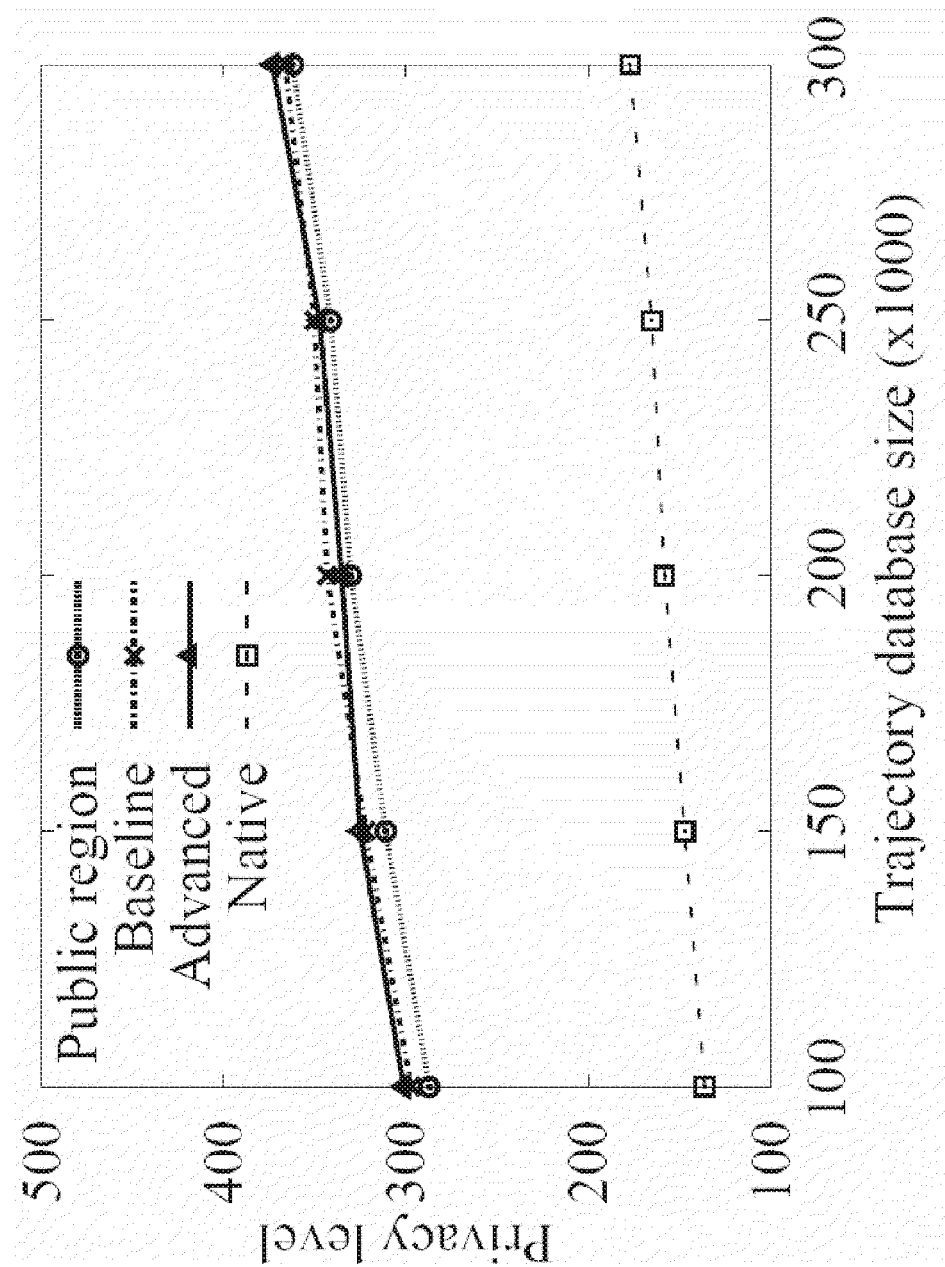

This study investigates the impact of the number of trajectories in the footprint database on the performance. We varied the number of trajectories in the database from 100,000 to 300,000. The performance results are plotted in FIGS. 12E and 12F. It is shown in FIG. 12E that all schemes have better cloaking results when the database contains more trajectories. Clearly, more historical trajectories mean that more footprints are collected in a fixed spatial region. As a result, a smaller cloaking box may be populous enough to meet the privacy requirement. By adding a service user's moving route to the database for future cloaking, our technique can generate better cloaking results. This feature makes it especially attractive for large-scale LBS that consist of a large number of users. FIG. 12F again shows that the protection level of Naïve is constantly lower than 1. On the other hand, the protection level of both Plain and Advanced is always above 1.

10. Implementation

We have implemented an experimental system based on the technique presented in the previous sections. The prototype, called location privacy aware gateway (LPAG), has two software components, client and server. Client is implemented in C# using Net Compact Framework 1.0. It runs on Windows Mobile 2003 platform and we have tested it with two types of mobile devices, HP IPAQ 6515 and HP IPAQ 4310. The former is a smart phone with a built-in 4-channel GPS receiver. The device communicates with the server through AT&T's GPRS wireless data services. As long as it is within the region covered by the carrier's service network, it can stay connected to the server which is located in our lab. The other type of client device, namely HP IPAQ 4310, is a regular pocket PC which connects with the server through the university's campus wireless network, which limits its roaming area to within our campus. To make it position-aware, we bundle it with an external 16-channel GPS receiver, which provides position information through a blue tooth connection. The server is implemented in C# using .Net Framework 1.0. It manages the historical location data and corresponding indices using MySQL 5.0, and cloaks mobile clients' location updates using the proposed techniques when they request LBSs.

Our test of LPAG consists a location sampling during which we collect users' footprints for location depersonalization. We create a number of client accounts, carry the devices and have a walk around the campus, during which the devices make periodic location updates to the sever. After a trajectory is collected, we randomly choose a client from the accounts created before, assign the trajectory to the client, and save it in the trajectory database in the server. In our testing of LPAG, we specify a rectangular region in the campus as the public region, and have a walk in the campus with a mobile device. During the walk, we send a sequence of queries to the server, each with our current position. For each query, the server generates a cloaking box using the proposed technique, and forwards it to the service provider. In response, the service provider delivers all the messages whose bounding boxes overlap the cloaking box to the server, and the server forwards to the client only the ones whose bounding box contains the client's current position. In the following subsections, we introduce our system's user interfaces and discuss the experimental results collected in our field tests.

10.1 Server and Client User Interface

Figure 13A:
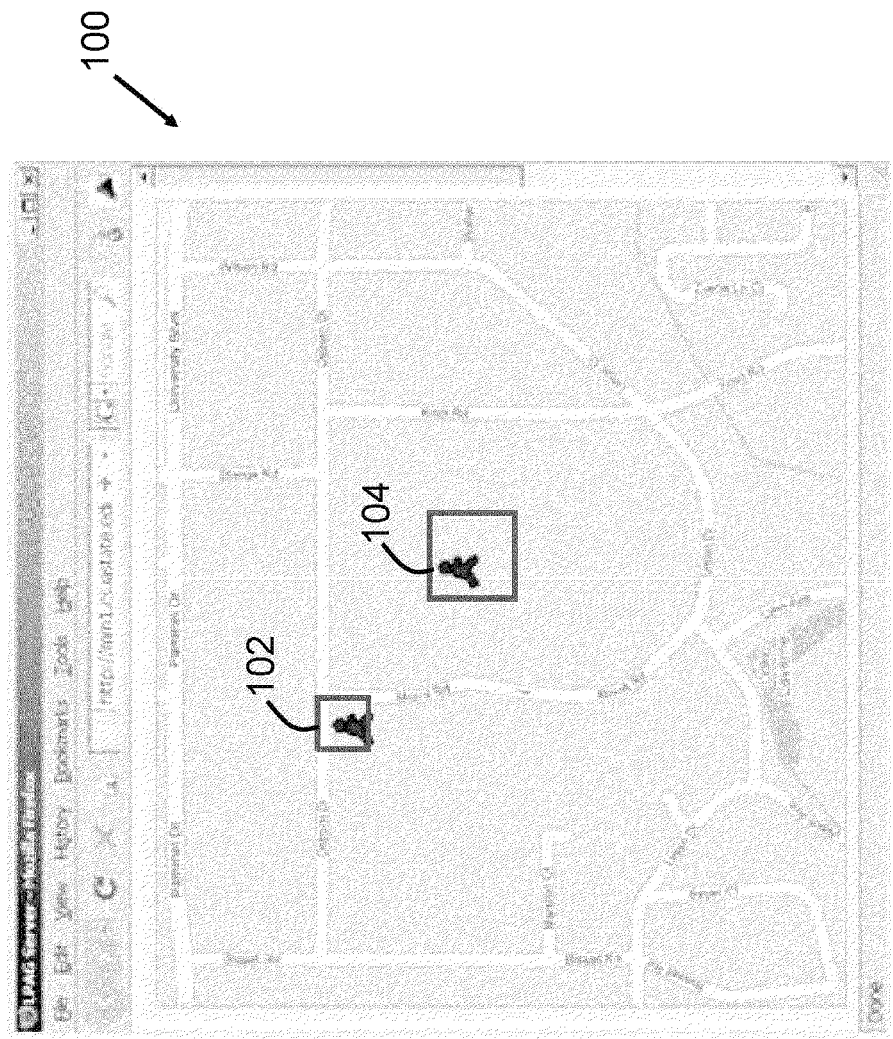
FIGS. 13A-13C illustrate server and client interfaces.

FIG. 13A shows the server interface. Every time the server receives a query from a client, it computes a cloaking box as the client's location in requesting the service. Then, the server displays the cloaking box and the client's position on the map. As the example shown in this figure, two clients and their cloaking boxes are displayed on the campus map. The screen display 100 of a mobile device includes a first client 102 in its corresponding cloaking box and a second client 104 in its corresponding cloaking box.

Figure 13B:
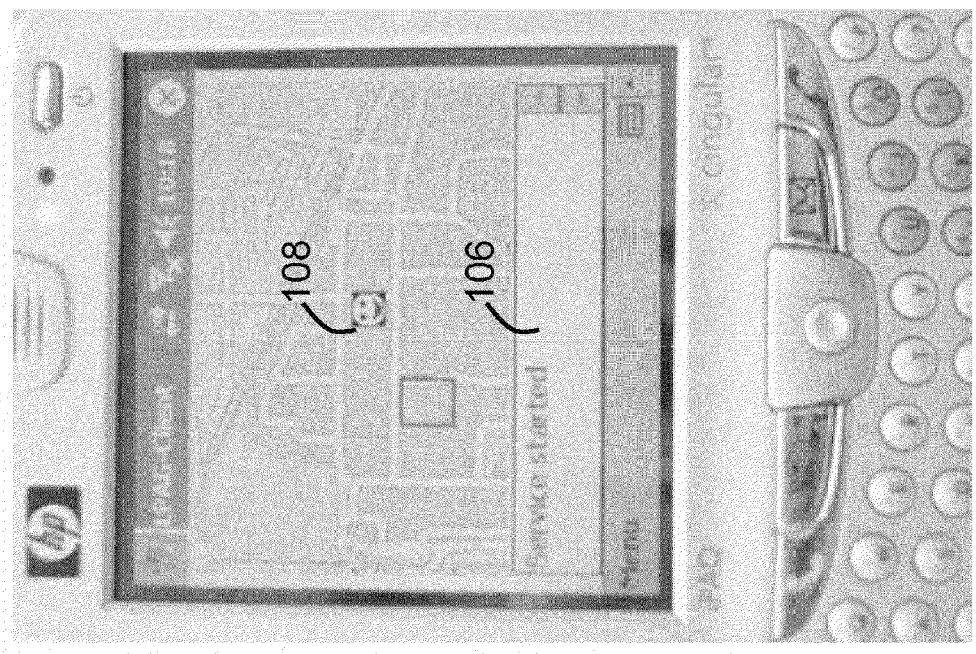
Figure 13C:
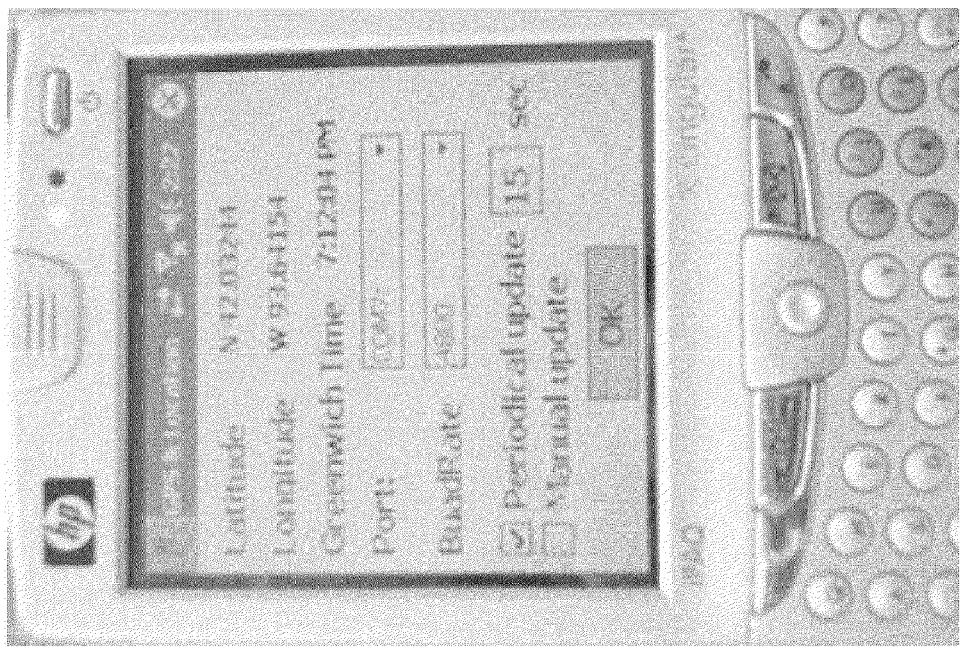

When a mobile device is powered on, the client finds out the current position and then connects to the server. After initialization, the screen shows a local map as its background and marks the client's position by a small face icon 108 (see FIG. 13B). A status area 106 is shown towards the bottom of the screen display. At the beginning of a session, the client can set the public region by clicking the touch screen to specify its top-left corner and bottom-right corner, and embed the public region in the query packet. In the example shown in FIG. 13B, the client specifies the library as her public region which is marked by the rectangle. In our experiments, the travel bound is set as the whole campus. Then, during the session, the client can choose to periodically update her location or manually update whenever she wants (see FIG. 13C). As shown in FIG. 13C a screen display shows that latitude, longitude, time, port, and baud rate. In addition settings are shown for providing updates to location information either automatically and periodically or manually.

10.2 Experimental Results

We first examine the system resources used by our code running on mobile devices.

CPU Utilization: We measure the CPU utilization of our client code on the smartphone using Xda pps, which allows one to monitor the CPU usage of all the processes running on a smart device. When the device is idling with no movement, the CPU utilization is about 1%, indicating that reading GPS position (every one second) does not take much computation. When the client moves around but does not make any location update, we observe that the CPU utilization is in between 4%-12%, as our code redraws the client's position on the map. When the client communicates with the server (e.g., location updates, message delivery), the CPU utilization is in between 10%-25%.

Memory and Storage: Our client executable is only 120 KB by itself. Since it is built on the .NET Compact Framework 1.0 and OPENNETCF 1.4, additional 2.5 MB and 580 KB files from the two platforms will be needed respectively. When running, our system has a memory footprint of 5.1 MB, which is less than 10% of available main memory on HP IPAQ6515 (57.78 MB) and HP IPAQ4310 (56.77 MB). On both devices, our code can run simultaneously with other applications such as media player and Internet explorer.

We also examine two performance metrics which affect the usability of our system.

GPS Accuracy: Because of position deviation of the GPS receiver, the position reported to the server may be different from the actual position of a client. If the position deviation is large, the bounding box computed by the server may not contain the client's position, and the client may get the false query result (missing or downloading wrong messages). In our experiments, we have tested the accuracy of the two types of GPS in the campus area. The smartphone we use has a built-in 4-channel GPS, while the external GPS bundled with the pocket PC has 16 channels. To calculate the position, a GPS receiver needs to have signals from at least 4 satellites. In general, the more channels available, the more accurate position it can compute. Our tests show that the 16-channel GPS has 5 meters error in average and 8 meters error in maximum. While the 4-channel GPS performs worse. It has 7 meters error in average and 14 meters error in maximum. These tests indicate that in the worst case the server should expand the boundary of the cloaking box by 15 meters to ensure the cloaking box contains the client's actual position, and the bounding box of a message should not be smaller than 15 m×15 m.

Response Time: The interval between the time a client sends a query and the time she receives the query result is mainly composed of four parts: (1) the time it takes to deliver the query from the client to the server, (2) the time the server uses to computes the cloaking box, (3) the time for the server to send the cloaking box to the service provider and receives candidate messages from the service provider, (4) the time it takes to download the resulting messages from the server to the client. Our experiments show that the server computes the cloaking box every fast, usually in less than 10 ms. In addition, the transmission speed between server and service provider are also very fast (>4 MB/s), since they are connected with a high speed LAN. The bottleneck is the communication between the client and the server, i.e., part (1) and (4). The smartphone we use connects to our server via AT&T's GPRS, while the Pocket PC connects to our server via our campus's WLAN. In our test, we create a number of messages, some with simple text messages (1-5 KB) and short audio clips (10-30 KB), while the rest with video clips (100-300 KB). Our tests show that for messages with simple text and audio clips, the smartphone and pocket PC can download them with a delay of less than 1 second and 3 seconds, respectively; for the messages with video clips, the pocket PC has a minimal delay of 5 seconds while the smartphone has a latency of more than 20 seconds. This study indicates that for cellular phones, our system is more appropriate for light-weighted messages. Fortunately, this will not be a problem as cellular carriers provide broadband wireless services.

11. Conclusion

According to one aspect, the present invention leverages historical location samples for location depersonalization. For each location/trajectory reported for an LBS, we ensure that it has been visited earlier by some minimal number of users. An adversary may be able to identify all these users, but will not know who was there at the time when the service was requested. As such, cloaking with footprints makes it possible to prevent the location information collected by the providers of LBSs from being used to derive who's where at what time.

One method assume uniform distribution of footprints and may generate a KAA/KAT (e.g. an office) where some user has a dominant presence. Another method measures the anonymity level of a KAA/KAT using entropy [22] [24], instead of the number of different users. In addition, some embodiments of the present invention provide on-the-fly cloaking.

Another aspect of the present invention uses a feeling-based model for location privacy protection. This model has two unique features. First, it allows mobile clients to configure their privacy preference based on their intuitive feeling. Instead of a number k, a client can specify a public region which she feels comfortable if the region is reported as her location. Second, we borrow the concept of entropy from information theory and use it to evaluate the privacy level of a spatial region. This approach takes into account not only the number of users who visit a spatial region, but also the frequency and duration of their visits. Based on this model, we investigate the problem of trajectory cloaking and propose a novel solution that is able to cloak a client's trajectory on the fly. For performance study, we have implemented a prototype that supports location privacy-aware uses of LBSs. The system allows us to evaluate the effectiveness of the proposed techniques under various conditions.

Therefore, a method for location depersonalization for location privacy protection in location-based services has been disclosed. That which has been described is merely exemplary. The present invention contemplates numerous variations, options, and alternatives fall within the spirit and scope of the invention.

12. References

The following references are cited throughout the text of the specification. Each of these references is hereby incorporated in its entirety.

[1] TIGER/LINE CENSUS FILES. http://www.land.state.az.us/alris/doc/apendh.txt, 1990.
[2] A. R. Beresford and F. Stajano. Location Privacy in Pervasive Computing. In *IEEE Security and Privacy*, volume 2, pages 46-55, 2003.
[3] C. Bettini, X. S. Wang, and S. Jajodia. Protecting Privacy Against Location-Based Personal Identification. In *Proceedings of the 2nd VLDB Workshop on Secure Data Management*, 2005.
[4] T. Brinkhoff. A Framework for Generating Network-Based Moving Objects. In *GeoInformatica*, volume 6(2), 2002.
[5] R. Cheng, Y. Zhang, E. Bertino, and S. Prabhakar. Preserving User Location Privacy in Mobile Data Management Infrastructures. In *the 6th Workshop on Privacy Enhancing Technologies*, pages 393-412, 2006.
[6] C. Y. Chow, M. F. Mokbel, and X. Liu. A Peer-to-Peer Spatial Cloaking Algorithm for Anonymous Location-based Services. In *ACM GIS '06*, pages 171-178, November 2006.
[7] C. Cornelius, A. Kapadia, D. Kotz, D. Peebles, and M. Shin. AnonySense: Privacy-Aware People-Centric Sensing. In *ACM Mobisys '08*, pages 211-224, June 2008.
[8] B. Gedik and L. Liu. A Customizable k-Anonymity Model for Protecting Location Privacy. In *ICDCS '05*, pages 620-629, 2005.
[9] G. Ghinita, P. Kalnis, and S. Skiadopoulos. PRIVE: Anonymous Location-based Queries in Distributed Mobile Systems. In *Proc. of the 16th international conference on World Wide Web*, pages 371-380, Banff, Alberta, Canada, 2007.
[10] M. Gruteser and D. Grunwald. Anonymous Usage of Location-based Services through Spatial and Temporal Cloaking. In *ACM MobiSys '03*, pages 31-42, 2003.
[11] Q. He, D. Wu, and P. Khosla. Personal Control over Mobile Location Privacy. In *IEEE Communications Magazine*, volume 42(5), 2004.
[12] B. Hoh and M. Gruteser. Protecting Location Privacy Through Path Confusion. In *IEEE/CreateNet Intl. Conference on Security and Privacy for Emerging Areas in Communication Networks (SecureComm)*, pages 194-205, 2005.
[13] B. Hoh, M. Gruteser, R. Herring, J. Ban, D. Work, J. Herrera, A. Bayen, M. Annavaram, and Q. Jacobson. Virtual Trip Lines for Distributed Privacy-Preserving Traffic Monitoring. In *ACM Mobisys '08*, pages 15-28, June 2008.
[14] B. Hoh, M. Gruteser, H. Xiong, and A. Alrababy. Preserving Privacy in GPS Traces via Uncertainty-Aware Path Cloaking. In *ACM CCS '07*, pages 161-171, October 2007.
[15] A. Inan and Y. Saygin. Location Anonymity in Horizontally Partitioned Spatial-Temporal Data. In *Master Thesis*, Sabanci University, Turkey, 2006.
[16] P. Kalnis, G. Ghinita, K. Mouratidis, and D. Papadias. Preserving Anonymity in Location Based Services. In *Technical Report TRB6/06*, Department of Computer Science, National University of Singapore, 2006.
[17] A. Kapadia, N. Triandopoulos, C. Cornelius, D. Peebles, and D. Kotz. AnonySense: Opportunistic and Privacy-Preserving Context Collection. In *The Sixth International Conference on Pervasive Computing (PERVASIVE '08)*, pages 280-297, May 2008.
[18] U. Leonhardt and J. Magee. Security Considerations for a Distributed Location Services. *Journal of Networks and Systems Management*, 6(1):51-70, March 1998.
[19] M. F. Mokbel, C.-Y. Chow, and W. G. Aref. The New Casper: Query Processing for Location Services without Compromising Privacy. In *Proceedings of the 32nd International Conference on Very Large Data Bases (VLDB '06)*, pages 763-774, 2006.
[20] K. Ren, W. Lou, K. Kim, and R. Deng. A Novel Privacy Preserving Authentication and Access Control Scheme in Pervasive Computing Environments. In *IEEE Transactions on Vehicular Technology*, volume 55(4), 2006.
[21] N. Roussopoulos, S. Kelley, and F. Vincent. Nearest Neighbor Queries. In *Proceedings of ACM SIGMOD '95*, pages 71-79, May 1995.
[22] A. Serjantov and G. Danezis. Towards an Information Theoretic Metric for Anonymity. In Roger Dingledine and Paul Syverson, editors, *Privacy Enhancing Technologies workshop (PET '02)*, volume 2482 of LNCS, pages 41-53. Springer-Verlag, 2002.
[23] K. Sha, Y. Xi, W. Shi, L. Schwiebert, and T. Zhang. Adaptive Privacy-Preserving Authentication in Vehicular Networks (Invited Paper). In *Proceedings of IEEE International Workshop on Vehicle Communication and Applications*, 2006.
[24] C. Shannon. The Mathematical Theory of Communication. In *Bell System Technical Journal*, volume 30, pages 50-64, 1948.

What is claimed is:

1. A method for using a location-based service while preserving anonymity by continuous cloaking using footprints, the method comprising:
   determining a base trajectory associated with a device, the base trajectory comprising at least two points;
   determining an anonymity level, K, associated with the device;
   wherein the anonymity level, K, being determined based on a spatial region specified by a user of the device;
   wherein the anonymity level, K, being determined by measuring popularity of the spatial region specified by the user of the device based on footprints collected from visitors to the spatial region, wherein the footprints include historical location samples;
   computing a K-anonymity trajectory using the base trajectory, the anonymity level, and a set of historical trajectories comprising footprints of other users to thereby cloak time-series location samples for the device;
   providing the K-anonymity trajectory to a location-based service to thereby preserve anonymity of the device and provide location privacy protection for the device;
   wherein computing the K-anonymity trajectory comprises cloaking the base trajectory with a set of K−1 trajectories; and wherein the computing the K-anonymity trajectory comprises selecting a small set of trajectories from a database for cloaking.

2. The method of claim 1 wherein the set of other trajectories is a set of K−1 other user trajectories.

3. The method of claim 1 wherein the computing the K-anonymity trajectory comprises performing an exhaustive search to find the K-anonymity trajectory.

4. The method of claim 1 wherein the computing the K-anonymity trajectory comprises applying a heuristic solution to find the K-anonymity trajectory.

5. The method of claim 1 wherein the computing the K-anonymity trajectory comprises cloaking the base trajectory with one trajectory.

6. The method of claim 1 wherein the computing the K-anonymity trajectory comprises cloaking the base trajectory with a set of K−1 trajectories.

\* \* \* \* \*